US008780147B2

(12) United States Patent
Tombs et al.

(10) Patent No.: US 8,780,147 B2
(45) Date of Patent: Jul. 15, 2014

(54) LARGE-PARTICLE SEMIPOROUS-PAPER INKJET PRINTER

(75) Inventors: Thomas Nathaniel Tombs, Rochester, NY (US); Donald Saul Rimai, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 254 days.

(21) Appl. No.: 13/245,964

(22) Filed: Sep. 27, 2011

(65) Prior Publication Data

US 2013/0076847 A1 Mar. 28, 2013

(51) Int. Cl.

| | |
|---|---|
| ***B41J 2/41*** | (2006.01) |
| ***G11B 3/00*** | (2006.01) |
| ***B41J 2/01*** | (2006.01) |
| ***B41J 2/415*** | (2006.01) |
| ***G03G 15/32*** | (2006.01) |
| *B41J 11/00* | (2006.01) |
| *G03G 15/34* | (2006.01) |

(52) U.S. Cl.

CPC ................. *G03G 15/321* (2013.01); *B41J 2/41* (2013.01); *B41J 11/002* (2013.01); *G03G 15/34* (2013.01)

USPC ............................ 347/112; 347/102; 347/125

(58) Field of Classification Search

USPC ........... 347/112, 16, 102, 125–126, 155–156, 347/158; 399/130

See application file for complete search history.

(56) References Cited

U.S. PATENT DOCUMENTS

| | | | | |
|---|---|---|---|---|
| 3,714,665 | A * | 1/1973 | Mutschler et al. | 347/155 |
| 3,731,520 | A * | 5/1973 | Hickman et al. | 73/73 |
| 4,312,268 | A | 1/1982 | King et al. | |
| 4,943,816 | A | 7/1990 | Sporer | |
| 5,255,023 | A * | 10/1993 | Bowlby et al. | 347/155 |
| 5,321,467 | A * | 6/1994 | Tanaka et al. | 399/2 |
| 5,329,295 | A * | 7/1994 | Medin et al. | 346/25 |
| 5,563,694 | A | 10/1996 | Katayama | |
| 5,627,578 | A | 5/1997 | Weintraub | |
| 5,714,990 | A * | 2/1998 | Courtney | 347/14 |
| 5,847,738 | A | 12/1998 | Tutt et al. | |
| 5,965,244 | A * | 10/1999 | Tang et al. | 428/32.36 |
| 6,132,021 | A * | 10/2000 | Smith et al. | 347/6 |
| 6,382,762 | B1 * | 5/2002 | Therien | 347/19 |

(Continued)

OTHER PUBLICATIONS

A.J. Rushing R.D. Fields, D.S. Rimai, A. Hoskins; "Toner Satellite Formation in Electrostatically Transferred Images," Journal of Imaging Science and Technology; vol. 45, No. 2, Mar./Apr. 2001; pp. 187-197.

*Primary Examiner* — Laura Martin
*Assistant Examiner* — Leonard S Liang
(74) *Attorney, Agent, or Firm* — Christopher J. White; Peyton C. Watkins

(57) ABSTRACT

A printer for printing on a semiporous recording medium includes a dryer adapted to dry the semiporous recording medium to a moisture content not to exceed that of the recording medium equilibrated to 20% RH. A liquid-deposition unit deposits hydrophilic liquid in a selected fluid pattern on the recording medium within 15 seconds after the completion of drying. A charging member charges the recording medium so that a charge pattern of charged and discharged areas is formed on the recording medium and the charged areas have a potential of at least 100 V. A development station deposits charged dry ink on the medium, the dry ink having charge of the same sign as the charged areas, so that the charged dry ink is deposited on the paper in a dry ink pattern corresponding to the selected fluid pattern.

11 Claims, 14 Drawing Sheets

(56) References Cited

U.S. PATENT DOCUMENTS

| | | | | |
|---|---|---|---|---|
| 6,424,364 | B2 * | 7/2002 | Gundlach et al. | 347/111 |
| 6,428,148 | B1 | 8/2002 | Gore | |
| 6,504,559 | B1 * | 1/2003 | Newton et al. | 347/171 |
| 6,585,367 | B2 | 7/2003 | Gore | |
| 6,596,447 | B2 * | 7/2003 | Camp et al. | 430/11 |
| 6,606,472 | B1 * | 8/2003 | Mori et al. | 399/251 |
| 6,716,562 | B2 | 4/2004 | Uehara et al. | |
| 6,908,189 | B2 * | 6/2005 | Miyamoto et al. | 347/102 |
| 6,952,541 | B2 * | 10/2005 | Fujimori et al. | 399/70 |
| 6,991,329 | B2 | 1/2006 | Gore | |
| 7,048,367 | B2 | 5/2006 | Roberts | |
| 7,187,881 | B2 * | 3/2007 | Tsujimura | 399/69 |
| 7,300,146 | B2 | 11/2007 | Roberts | |
| 7,910,520 | B2 * | 3/2011 | Van Baak et al. | 503/227 |
| 2002/0108702 | A1 * | 8/2002 | Ueno et al. | 156/227 |
| 2004/0095451 | A1 * | 5/2004 | Tatsumi et al. | 347/101 |
| 2004/0183880 | A1 * | 9/2004 | Kito | 347/101 |
| 2004/0240893 | A1 * | 12/2004 | Sato et al. | 399/8 |
| 2005/0156961 | A1 * | 7/2005 | Silverbrook et al. | 347/5 |
| 2008/0008487 | A1 * | 1/2008 | Furuya | 399/51 |
| 2008/0063958 | A1 * | 3/2008 | Koga et al. | 430/48 |
| 2011/0074864 | A1 * | 3/2011 | Yamada et al. | 347/20 |

* cited by examiner

LARGE-PARTICLE SEMIPOROUS-PAPER INKJET PRINTER

CROSS-REFERENCE TO RELATED APPLICATIONS

Reference is made to commonly assigned, U.S. patent application Ser. No. 13/245,931, filed Sep. 27, 2011, entitled "INKJET PRINTING USING LARGE PARTICLES," by Thomas N. Tombs, et al.; 13/245,947, filed Sep. 27, 2011, entitled "INKJET PRINTER USING LARGE PARTICLES," by Thomas N. Tombs, et al.; Ser. No. 13/245,971, filed Sep. 27, 2011, entitled "ELECTROGRAPHIC PRINTING USING FLUIDIC CHARGE DISSIPATION," by Thomas N. Tombs, et al.; Ser. No. 13/245,957, filed Sep. 27, 2011, entitled "LARGE-PARTICLE INKJET PRINTING ON SEMIPOROUS PAPER," by Thomas N. Tombs, et al.; Ser. No. 13/245,977, filed Sep. 27, 2011, entitled "ELECTROGRAPHIC PRINTER USING FLUIDIC CHARGE DISSIPATION," by Thomas N. Tombs, et al.; and U.S. patent application Ser. No. Ser. No. 13/077,496, filed Mar. 31, 2011, entitled "DUAL TONER PRINTING WITH DISCHARGE AREA DEVELOPMENT," by William Y. Fowlkes, et al.; the disclosures of which are incorporated by reference herein.

FIELD OF THE INVENTION

This invention pertains to the field of digitally controlled printing systems.

BACKGROUND OF THE INVENTION

Printers are useful for producing printed images of a wide range of types. Printers print on receivers (or "imaging substrates" or "recording media"), such as pieces or sheets of paper or other planar media, glass, fabric, metal, or other objects. Examples of such media include fabrics, uncoated papers such as bond papers, semi-absorbent papers such as clay coated papers commonly used in lithographic printing (e.g., Potlatch Vintage Gloss, Potlatch Vintage Velvet, Warren Offset Enamel, and Kromekote papers), and non-absorbent papers such as polymer-coated papers used for photographic printing.

Printers typically operate using subtractive color: a substantially reflective recording medium is overcoated imagewise with cyan (C), magenta (M), yellow (Y), black (K), and other colorants. Various schemes can be used to print images. For example, inkjet printing deposits drops of liquid ink in appropriate locations on a recording medium to form an image. However, inkjet printing is limited in the density it can produce.

U.S. Pat. No. 4,943,816 to Sporer discloses the use of a marking fluid containing no dye so that a latent image in the form of fluid drops is formed on a piece of paper. The marking fluid is relatively non-wetting to the paper. Sporer teaches the use of a 300 dpi thermal inkjet printer to produce the latent image. Surface tension is then used to adhere colored powder. Sporer teaches that only that portion of the droplet that has not penetrated or feathered into the paper is available for attracting dry ink, so this process is unsuitable for highly-absorbent papers such as newsprint. Because of the limitations taught by Sporer of using thermal drop-on-demand and the limitation of 300 dpi, this process is only suitable for low volume, low speed printing applications requiring only modest image quality. There is therefore a continuing need for a way of producing high-quality images at high speed using inkjet printers.

SUMMARY OF THE INVENTION

Several problems with inkjet inks have been identified. First, lithographic inks conventionally used for high-quality, high-volume printing are highly viscous and contain a high concentration of pigment. In contrast, inkjet inks have low viscosity in order to be able to be jetted from an inkjet nozzle or head. Typical inkjet inks contain at most 10% solid colorants. Since inkjet inks penetrate into the paper and have low colorant concentrations, such prints often suffer from low image density. In contrast, images printed by lithographic (litho) and electrophotographic (EP) processes have high density, and correspondingly higher image quality. In litho and EP printers, the ink, colorant, or marking particulate matter resides on the surface of the paper, thereby blocking light from reaching the paper fibers. Prior schemes using purpose-made coated inkjet papers to attempt to improve image density are limited in the type of paper that can be used, and coated inkjet papers are generally more expensive than standard commercial papers.

Furthermore, typical aqueous- or solvent-based-inkjet droplets have volumes between approximately 2 and 10 pL, corresponding to spherical-droplet diameters of approximately 16 μm and 27 μm, respectively. Upon striking a non-absorbent receiver, the droplets can spread by between 1.5× and 3× (e.g., as described in U.S. Pat. No. 6,702,425, which is incorporated herein by reference). This results in spot sizes of between 24 μm and 81 μm, substantially larger than a 5-9 μm-diameter dry ink particle. In some systems, droplets can spread by 15× (as described in U.S. Pat. No. 7,232,214, which is incorporated herein by reference), resulting in spot sizes between 30 μm and 150 μm. The large size of the ink droplet limits resolution and can produce image artifacts such as granularity and mottle. (Small-drop-spread systems can also produce low-quality images because of the relatively lower proportion of the paper that is covered, e.g., as described in U.S. Pat. No. 5,847,721, which is incorporated herein by reference.)

Despite large drop sizes, higher loadings of colorant or larger pigment particles cannot be used without compromising the jetting performance of the inkjet printer. These limitations on ink composition prevent aqueous inkjet systems from producing glossy or raised-letter prints (which are examples of "special-effects" prints) that EP printers are capable of producing. Although ultraviolet (UV)-curable inks can provide some effects, they have much higher viscosity than aqueous inks. Moreover, UV-curable inks require special handling to ensure that they are not exposed to ultraviolet light (e.g., from the sun) before they are printed. UV-curable inks are also not suited for as wide a range of substrates as aqueous inks.

Finally, it can be difficult to make high quality inkjet prints using conventional clay-coated graphic arts papers that are commonly used in EP and lithographic printing, since such papers do not readily absorb ink. Instead, to produce high quality images with inkjet printing, special coatings are applied to clay-coated paper. The coatings are designed to rapidly absorb and coalesce the ink droplets.

The present invention provides a large-particle inkjet system that provides the high speed of inkjet printing and the high image quality and special-effects capability of EP printing. Various embodiments of large-particle inkjet use liquid ink and dry ink together to produce images or special-effects prints. Large-particle inkjet is different from conventional dye-based inkjet or the clear-ink inkjet of U.S. Pat. No. 4,943,816 because those known systems use colorant on the molecular scale (dyes or pigments), not on the particle scale (micron-sized). Moreover, large-particle inkjet is different from conventional pigment-based inkjet because the dry ink particles used in large-particle inkjet, e.g., 4-8 μm in diameter, are much larger than the pigment particles suspended in the inkjet inks, e.g., 0.1 μm in diameter.

According to an aspect of the present invention, therefore, there is provided an apparatus for producing a print on a semiporous recording medium, comprising:

a transport for moving the semiporous recording medium along a transport path;

a dryer, a liquid-deposition unit, a charging member, a development station, and a fixer arranged in that order along the transport path;

the dryer adapted to dry a selected region of the semiporous recording medium to a moisture content not to exceed that of the recording medium equilibrated to 20% RH;

the liquid-deposition unit adapted to deposit hydrophilic liquid in a selected fluid pattern on the selected region of the recording medium within 15 seconds after the completion of drying, whereby a wetted area of the recording medium is produced so that the resistivity of the wetted area of the semiporous recording medium becomes no greater than $5\times10^{11}$ Ω-cm;

the charging member adapted to charge the selected region of the recording medium so that a charge pattern of charged and discharged areas is formed on the recording medium and the charged areas have a potential of at least 100 V; and the development station adapted to deposit charged dry ink in the selected region, the dry ink having charge of the same sign as the charged areas, so that the charged dry ink is deposited on the paper in a dry ink pattern corresponding to the selected fluid pattern in the selected region by electrical forces arising from the charge on the dry ink and the electric field between the development station and the charge pattern on the paper.

An advantage of this invention is that larger particles can be deposited than is possible with small-drop inkjet printers, providing improved image quality and enhanced special-effects capability. Large particles can be printed without requiring an EP photoreceptor and the associated cleaning and transfer hardware. Various embodiments permit selective glossing or raised-letter printing using inkjet technology on conventional papers. In embodiments using dry ink particles with a thermoplastic polymer binder, the dry ink particles can be deinked using conventional deinking solvents. This permits digital printing of images having the high quality, print density, and durability of an electrophotographic print without the costs associated with exposure, photoreceptor, and dry ink transfer systems. Since an EP primary imaging member is not used, the cost of a printer is reduced and its reliability can be improved.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

Figure 1:
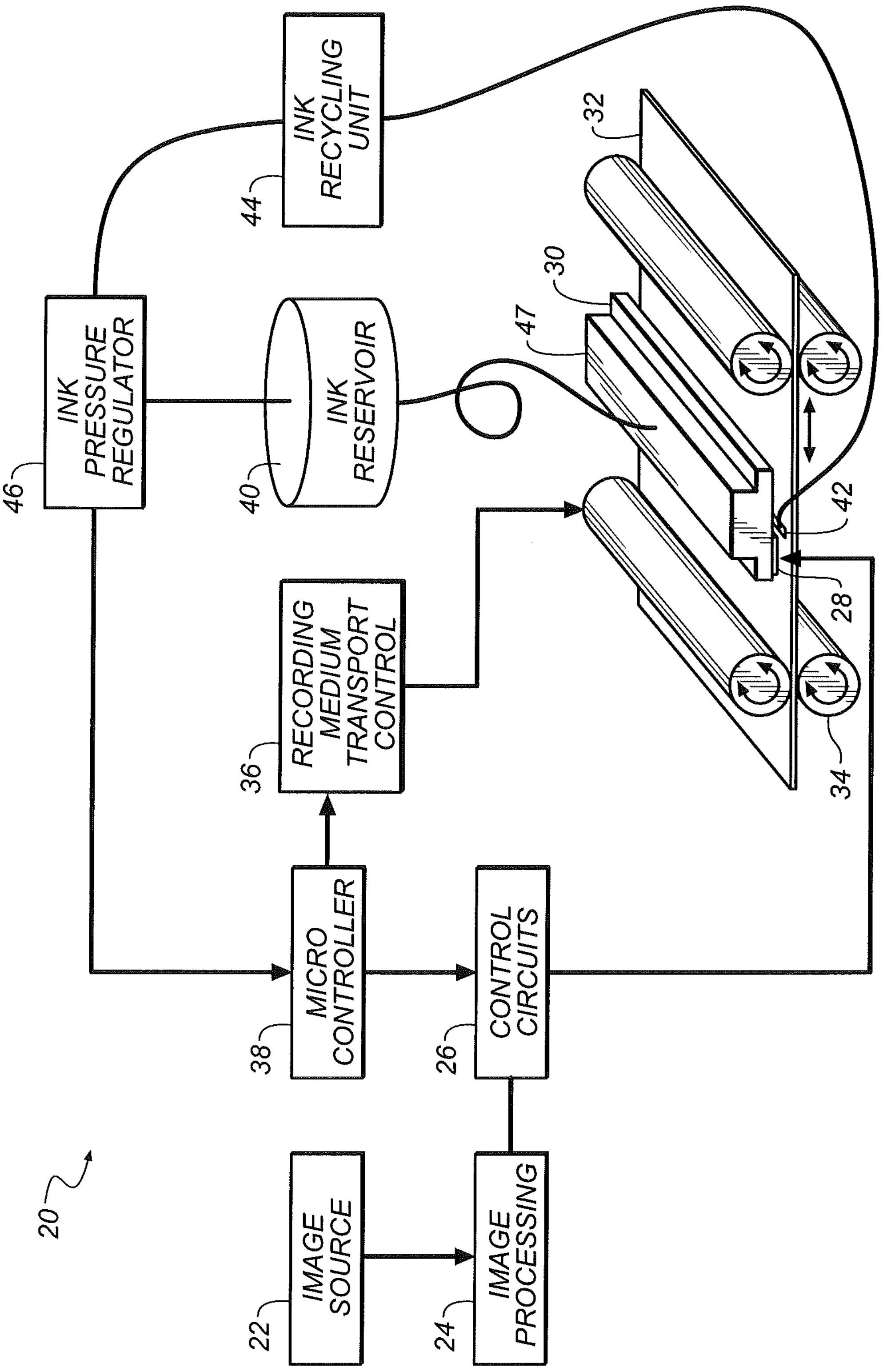
FIG. 1 is a schematic diagram of a continuous-inkjet printing system useful with various embodiments.

The attached drawings are for purposes of illustration and are not necessarily to scale.

DETAILED DESCRIPTION OF THE INVENTION

As used herein, the term "paper" refers to a material that is generally made by pressing together moist fibers or weaving fibers. Papers include fibers derived from cellulose pulp derived from wood, rags, or grasses and drying them into flexible sheets or rolls. Paper generally contains moisture which remains after drying or is absorbed from exposure to air. Therefore, the term "paper" used herein includes conventional materials sold as paper and other materials, such as canvas, that possess corresponding characteristics.

As used herein, oliophilic and hydrophobic liquids are defined as organic liquids that are either immiscible or only slightly miscible with water. These include aliphatic and aromatic hydrocarbons. Hydrophilic and oliophobic liquids are defined as liquids that are wholly or substantially miscible with water. These include water-based solutions and suspensions such as inkjet inks containing pigments or dyes, water-based solutions, and low carbon alcohols, i.e. alcohols containing four or fewer carbons. Such alcohols include methanol, ethanol, propanol, butanol, isopropanol, isobutanol, and glycol. It should be noted that not all components of a hydrophilic liquid are necessarily soluble in water. For example, certain inkjet inks contain less than 10% (and generally less than 5%) pigment particles that are not soluble in water. Even though the pigment particles are not soluble in water, the inkjet ink is a hydrophilic liquid.

Inkjet inks contain a solvent or dispersant that either dissolves or disperses colorant. As used herein, "solvent" refers to this solvent or dispersant. Colorant can be in particulate form such as pigment particles. Alternatively, the colorant can be a dye that is either dissolved or dispersed in the solvent. Inkjet inks can also contain other components such as surfactants, dispersants that impart electrical charge to pigment particles to create a stable suspension, humectants, and fungicides. Oliophilic solvent-based inkjet inks are known, but most inkjet inks use hydrophilic solvents such as water or a low-carbon-containing alcohol.

Some dry ink particles do not contain macroscopic voids or pores, i.e., they are not porous. Porous dry ink particles can also be used. The surface-area-to-mass ratio of dry ink particles can be determined using the "BET" technique (devised by Brunauer, Emmett, and Teller). In this technique, nitrogen gas is absorbed onto a surface of a known mass of the dry ink particles. A solid (i.e., nonporous) dry ink of in the range of 5 μm to 9 μm would have a surface area of approximately 2 $m^2/g$. The addition of submicrometer particulate addenda can increase the surface area of the dry ink particles. For example, 3% by weight silica can increase the surface area to approximately 4 $m^2/g$. Porous particles can be classified as either open- or closed-cell. For a closed-cell porous dry ink, the majority of voids are separated from each other by the polymer binder of the dry ink. In an open-cell porous dry ink, the majority of voids are interconnected. The presence of interconnectivity can be determined by microtoming porous dry ink particles and examining the cellular structure in a transmission electron microscope (TEM). Alternatively, BET can be used to determine whether a porous dry ink has an open- or closed-cell structure. The surface area per unit mass of a porous dry ink is greater than that of a nonporous dry ink because the porous dry ink is less dense. Thus, the density of a porous dry ink is determined by measuring the volume of a known mass of dry ink and comparing that to the volume of an equivalent mass of nonporous dry ink of comparable size and similar polymer binder material. The surface area per unit mass is then measured using BET. For a closed-cell porous dry ink, the surface area per unit mass is approximately the same as that of the nonporous dry ink times the ratio of the mass densities of the nonporous and porous dry inks. Thus, a closed-cell porous dry ink with voids occupying half the dry ink would have a mass density of half of a comparable nonporous dry ink, and a corresponding surface area per unit mass twice that of the nonporous dry ink. If the surface area per unit mass measured by BET exceeds that predicted from the density measurements by a factor of at least two, the dry ink is considered an open-cell porous dry ink.

Dry inks used in EP printing can include dry particles containing a polymeric binder such as polyester or polystyrene. Dry ink can include charge agents to impart a specific dry ink charge or colorants. Moreover, submicrometer particulate addenda particles, such as various forms of hydrophobic silica, titanium dioxide, and strontium titanate, can be disposed on the surface of the dry ink to further control dry ink charge, enhance flow, and decrease adhesion and cohesion. Dry ink particles can include a colorant. The colorant can be a pigment or a dye. Present day dry ink particles have a diameter between approximately 5 μm and 9 μm and are made either by grinding or by chemical processes such as evaporative limited coalescence (ELC). For purposes of this disclosure, unless otherwise specified, the terms "dry ink diameter" and "dry ink size" refer to the volume weighted median particle diameter, as measured using a commercial device such as a Coulter Multisizer.

In the following description, some embodiments of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein, are selected from such systems, algorithms, components, and elements known in the art. Given the system as described according to the invention in the following, software not specifically shown, suggested, or described herein that is useful for implementation of the invention is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

As described herein, the example embodiments of the present invention provide a printhead or printhead components typically used in inkjet printing systems. However, many other applications are emerging which use inkjet printheads to emit liquids (other than inks) that need to be finely metered and deposited with high spatial precision. As such, as described herein, the terms "liquid" and "ink" refer to any material that can be ejected by the inkjet printhead or inkjet printhead components described herein.

In continuous inkjet printing, a pressurized ink source is used to eject a filament of fluid through a nozzle bore from which ink drops are continually formed using a drop forming device. The ink drops are directed to a desired location using electrostatic deflection, heat deflection, gas-flow deflection, or other deflection techniques. "Deflection" refers to a change in the direction of motion of a given drop. For simplicity, drops will be described herein as either undeflected or deflected. However, "undeflected" drops can be deflected by a certain amount, and "deflected" drops deflected by more than the certain amount. Alternatively, "deflected" and "undeflected" drops can be deflected in opposite directions.

In various embodiments, to print in an area of a recording medium or receiver, undeflected ink drops are permitted to strike the recording medium. To provide unprinted areas of the recording medium, drops which would land in that area if undeflected are instead deflected into an ink capturing mechanism such as a catcher, interceptor, or gutter. These captured drops can be discarded or returned to the ink source for re-use. In other embodiments, deflected ink drops strike the recording medium to print, and undeflected ink drops are collected in the ink capturing mechanism to provide non-printing areas.

FIG. 1 is a schematic diagram of a continuous-inkjet printing system useful with various embodiments. Continuous printing system 20 includes image source 22, e.g., a scanner or computer, that provides raster image data, outline image data in the form of a page description language, or other forms of digital image data. This image data is converted to halftoned bitmap image data and stored in memory by image processing unit 24. A plurality of drop forming mechanism control circuits 26 read data from the image memory and apply time-varying electrical pulses to one or more drop forming device(s) 28, each associated with one or more nozzles of a printhead 30. These pulses are applied at an appropriate time, and to the appropriate nozzle, so that drops formed from a continuous inkjet stream will form spots on a recording medium 32 in the appropriate positions designated by the data in the image memory.

Recording medium 32 is moved relative to printhead 30 by a recording medium transport system 34, which is electronically controlled by a recording medium transport control system 36, which in turn is controlled by a micro-controller

38. Micro-controller 38 controls the timing of control circuits 26 and recording medium transport control system 36 so that drops land at the desired locations on recording medium 32. Micro-controller 38 can be implemented using an MCU, FPGA, PLD, PLA, PAL, CPU, or other digital stored-program or stored-logic control element. The recording medium transport system 34 shown in FIG. 1 is a schematic only, and many different mechanical configurations are possible. For example, a transfer roller can be used in recording medium transport system 34 to facilitate transfer of the ink drops to recording medium 32. With page-width printheads, recording medium 32 can be moved past a stationary printhead. With scanning print systems, the printhead can be moved along one axis (the sub-scanning or fast-scan direction), and the recording medium can be moved along an orthogonal axis (the main scanning or slow-scan direction) in a relative raster motion.

Ink is contained in ink reservoir 40 under pressure. In the non-printing state, continuous inkjet drop streams are not permitted to reach recording medium 32. Instead, they are caught in ink catcher 42, which can return a portion of the ink to ink recycling unit 44. Ink recycling unit 44 reconditions the ink and feeds it back to reservoir 40. Ink recycling units can include filters. A preferred ink pressure for a given printer can be selected based on the geometry and thermal properties of the nozzles and the thermal properties of the ink. Ink pressure regulator 46 controls the pressure of ink applied to ink reservoir 40 to maintain ink pressure within a desired range. Alternatively, ink reservoir 40 can be left unpressurized (gauge pressure approximately zero, so air in ink reservoir 40 is at approximately 1 atm of pressure), or can be placed under a negative gauge pressure (vacuum). In these embodiments, a pump (not shown) delivers ink from ink reservoir 40 under pressure to the printhead 30. Ink pressure regulator 46 can include an ink pump control system.

The ink is distributed to printhead 30 through an ink manifold 47. Ink manifold 47 can include one or more ink channels or ports. Ink flows through slots or holes etched through a silicon substrate of printhead 30 to the front surface of printhead 30, where a plurality of nozzles and drop forming mechanisms, for example, heaters, are situated. When printhead 30 is fabricated from silicon, drop forming mechanism control circuits 26 can be integrated with the printhead. Printhead 30 also includes a deflection mechanism (not shown in FIG. 1) which is described in more detail below with reference to FIGS. 2 and 3.

Figure 2:
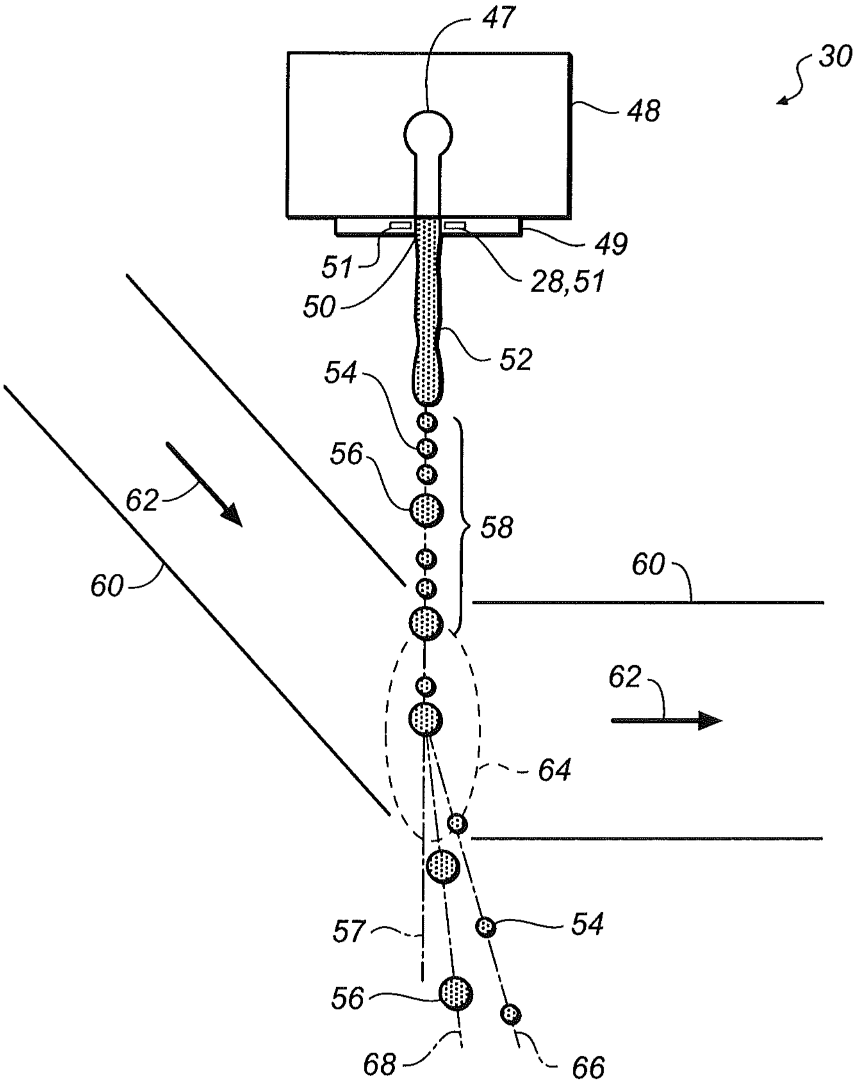
FIG. 2 is an elevational cross-section of a continuous inkjet printhead useful with various embodiments.

FIG. 2 is an elevational cross-section of a continuous inkjet printhead 30 useful with various embodiments. A jetting module 48 of printhead 30 includes an array or a plurality of nozzles 50 formed in nozzle plate 49. In FIG. 2, nozzle plate 49 is affixed to jetting module 48. Nozzle plate 49 can also be an integral portion of the jetting module 48.

Liquid, for example, ink, is emitted under pressure through each nozzle 50 of the array to form filaments 52 of liquid. In FIG. 2, the array or plurality of nozzles extends into and out of the plane of the figure.

Jetting module 48 is operable to form, through each nozzle, liquid drops having a first size or volume and liquid drops having a second size or volume different from the first size or volume. The two sizes are referred to as “small” and “large” relative to each other; no limitation of magnitude or difference in magnitude should be inferred from this terminology. Small drops can be either undeflected or deflected, as can large drops. To produce two sizes of drops, jetting module 48 includes a drop stimulation or drop forming device 28, for example, a heater or a piezoelectric actuator. When drop-forming device 28 is selectively activated, it provides energy that perturbs filament 52 of liquid to induce portions of each filament 52 to break off from filament 52 and coalesce to form drops, e.g., small drops 54 or large drops 56.

In FIG. 2, drop forming device 28 is a heater 51, for example, an asymmetric heater or a ring heater (either segmented or not segmented), located in a nozzle plate 49 on one or both sides of nozzle 50. Examples of this type of drop formation are described in, for example, U.S. Pat. No. 6,457,807, issued to Hawkins et al., on Oct. 1, 2002; U.S. Pat. No. 6,491,362, issued to Jeanmaire, on Dec. 10, 2002; U.S. Pat. No. 6,505,921, issued to Chwalek et al., on Jan. 14, 2003; U.S. Pat. No. 6,554,410, issued to Jeanmaire et al., on Apr. 29, 2003; U.S. Pat. No. 6,575,566, issued to Jeanmaire et al., on Jun. 10, 2003; U.S. Pat. No. 6,588,888, issued to Jeanmaire et al., on Jul. 8, 2003; U.S. Pat. No. 6,793,328, issued to Jeanmaire, on Sep. 21, 2004; U.S. Pat. No. 6,827,429, issued to Jeanmaire et al., on Dec. 7, 2004; and U.S. Pat. No. 6,851,796, issued to Jeanmaire et al., on Feb. 8, 2005, the disclosures of all of which are incorporated herein by reference.

Typically, one drop forming device 28 is associated with each nozzle 50 of the nozzle array. However, a drop forming device 28 can be associated with groups of nozzles 50 or all of nozzles 50 of the nozzle array.

When printhead 30 is in operation, drops 54, 56 are typically created in a plurality of sizes or volumes, for example, in the form of large drops 56, a first size or volume, and small drops 54, a second size or volume. The ratio of the mass of the large drops 56 to the mass of the small drops 54 is typically approximately an integer between 2 and 10. A drop stream 58 including drops 54, 56 follows a drop path or trajectory 57.

Printhead 30 also includes a gas flow deflection mechanism 60 that directs a gas flow 62, for example, air, past a portion of the drop trajectory 57. This portion of the drop trajectory is called the deflection zone 64. As the gas flow 62 interacts with drops 54, 56 in deflection zone 64 it alters the drop trajectories. As the drop trajectories pass out of the deflection zone 64 they are traveling at an angle, called a deflection angle, relative to the undeflected drop trajectory 57.

Small drops 54 are more affected by gas flow 62 than are large drops 56 so that the small drop trajectory 66 diverges from the large drop trajectory 68. That is, the deflection angle for small drops 54 is larger than for large drops 56. The gas flow 62 provides sufficient drop deflection and therefore sufficient divergence of the small and large drop trajectories so that catcher 42 (shown in FIGS. 1 and 3) can be positioned to intercept one of the small drop trajectory 66 and the large drop trajectory 68 so that drops following the trajectory are collected by catcher 42 while drops following the other trajectory bypass the catcher 42 and impinge a recording medium 32 (shown in FIGS. 1 and 3).

When catcher 42 is positioned to intercept large drop trajectory 68, small drops 54 are deflected sufficiently to avoid contact with catcher 42 and strike the recording media. As the small drops are printed, this is called small drop print mode. When catcher 42 is positioned to intercept small drop trajectory 66, large drops 56 are the drops that print. This is referred to as large drop print mode.

Various embodiments can use gas flow deflection as described in U.S. Pat. No. 6,588,888 or U.S. Pat. No. 4,068,241, or electrostatic deflection as described in U.S. Pat. No. 4,636,808, the disclosures of all of which are incorporated herein by reference.

Figure 3:
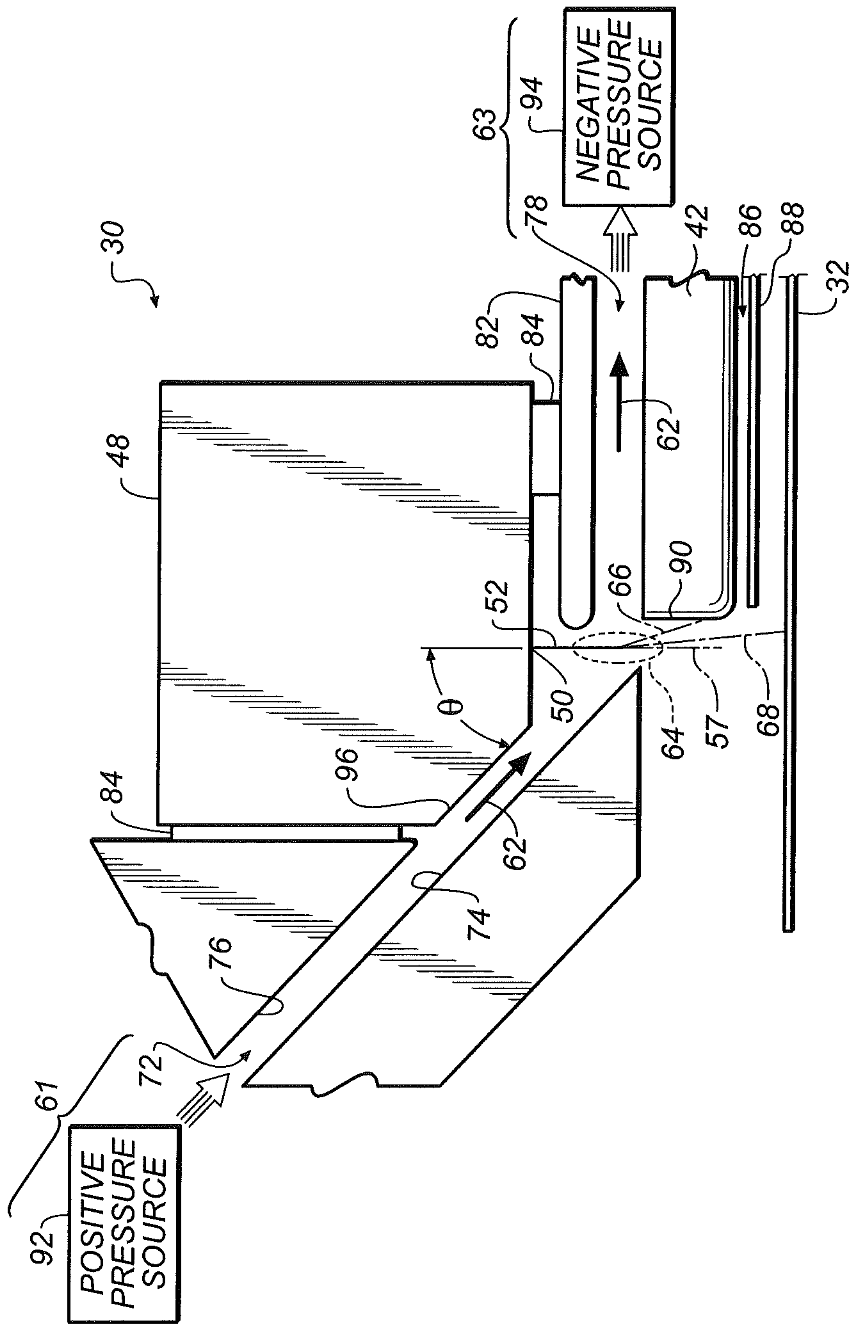
FIG. 3 is an elevational cross-section of portions of a continuous-inkjet printer useful with various embodiments.

FIG. 3 is an elevational cross-section of portions of a continuous-inkjet printer useful with various embodiments. Jetting module 48 includes an array or a plurality of nozzles 50. Liquid, for example, ink, supplied through manifold 47 (see FIGS. 1 and 2), is emitted under pressure through each nozzle

50 of the array to form filaments 52 of liquid. In FIG. 3, the array or plurality of nozzles 50 extends into and out of the figure.

Drop stimulation or drop forming device 28 (shown in FIGS. 1 and 2) associated with jetting module 48 is selectively actuated to perturb the filament 52 of liquid to induce portions of the filament to break off from the filament to form drops. In this way, drops are selectively created in the form of large drops and small drops that travel toward a recording medium 32.

Positive pressure gas flow structure 61 of gas flow deflection mechanism 60 is located on a first side of drop trajectory 57. Positive pressure gas flow structure 61 includes first gas flow duct 72 that includes a lower wall 74 and an upper wall 76. Gas flow duct 72 directs gas flow 62 supplied from a positive pressure source 92 at downward angle θ of approximately 45° relative to liquid filament 52 toward drop deflection zone 64 (also shown in FIG. 2). An optional seal(s) 84 provides an air seal between jetting module 48 and upper wall 76 of gas flow duct 72.

Upper wall 76 of gas flow duct 72 does not need to extend to drop deflection zone 64 (as shown in FIG. 2). In FIG. 3, upper wall 76 ends at a wall 96 of jetting module 48. Wall 96 of jetting module 48 serves as a portion of upper wall 76 ending at drop deflection zone 64.

Negative pressure gas flow structure 63 of gas flow deflection mechanism 60 is located on a second side of drop trajectory 57. Negative pressure gas flow structure includes a second gas flow duct 78 located between catcher 42 and an upper wall 82 that exhausts gas flow from deflection zone 64. Second duct 78 is connected to a negative pressure source 94 that is used to help remove gas flowing through second duct 78. An optional seal(s) 84 provides an air seal between jetting module 48 and upper wall 82.

As shown in FIG. 3, gas flow deflection mechanism 60 includes positive pressure source 92 and negative pressure source 94. However, depending on the specific application contemplated, gas flow deflection mechanism 60 can include only one of positive pressure source 92 and negative pressure source 94.

Gas supplied by first gas flow duct 72 is directed into the drop deflection zone 64, where it causes large drops 56 to follow large drop trajectory 68 and small drops 54 to follow small drop trajectory 66. As shown in FIG. 3, small drop trajectory 66 is intercepted by a front face 90 of catcher 42. Small drops 54 contact face 90 and flow down face 90 and into a liquid return duct 86 located or formed between catcher 42 and a plate 88. Collected liquid is either recycled and returned to ink reservoir 40 (shown in FIG. 1) for reuse or discarded. Large drops 56 bypass catcher 42 and travel on to recording medium 32. Alternatively, catcher 42 can be positioned to intercept large drop trajectory 68. Large drops 56 contact catcher 42 and flow into a liquid return duct located or formed in catcher 42. Collected liquid is either recycled for reuse or discarded. Small drops 54 bypass catcher 42 and travel on to recording medium 32.

Alternatively, deflection can be accomplished by applying heat asymmetrically to filament 52 of liquid using an asymmetric heater 51. When used in this capacity, asymmetric heater 51 typically operates as the drop forming mechanism in addition to the deflection mechanism. Examples of this type of drop formation and deflection are described in, for example, U.S. Pat. No. 6,079,821, issued to Chwalek et al., on Jun. 27, 2000, the disclosure of which is incorporated herein by reference.

Deflection can also be accomplished using an electrostatic deflection mechanism. Typically, the electrostatic deflection mechanism either incorporates drop charging and drop deflection in a single electrode, like the one described in U.S. Pat. No. 4,636,808, or includes separate drop charging and drop deflection electrodes. Continuous inkjet printer systems can also use electrostatic drop deflection mechanisms, pressure-modulation or vibrating-body stimulation devices, or nozzle plates fabricated out of silicon or non-silicon materials or silicon compounds.

As shown in FIG. 3, catcher 42 is a type of catcher commonly referred to as a "Coanda" catcher. However, a "knife edge" catcher can also be used. Alternatively, catcher 42 can be of any suitable design including, but not limited to, a porous face catcher, a delimited edge catcher, or combinations of any of those described above.

Figure 4:
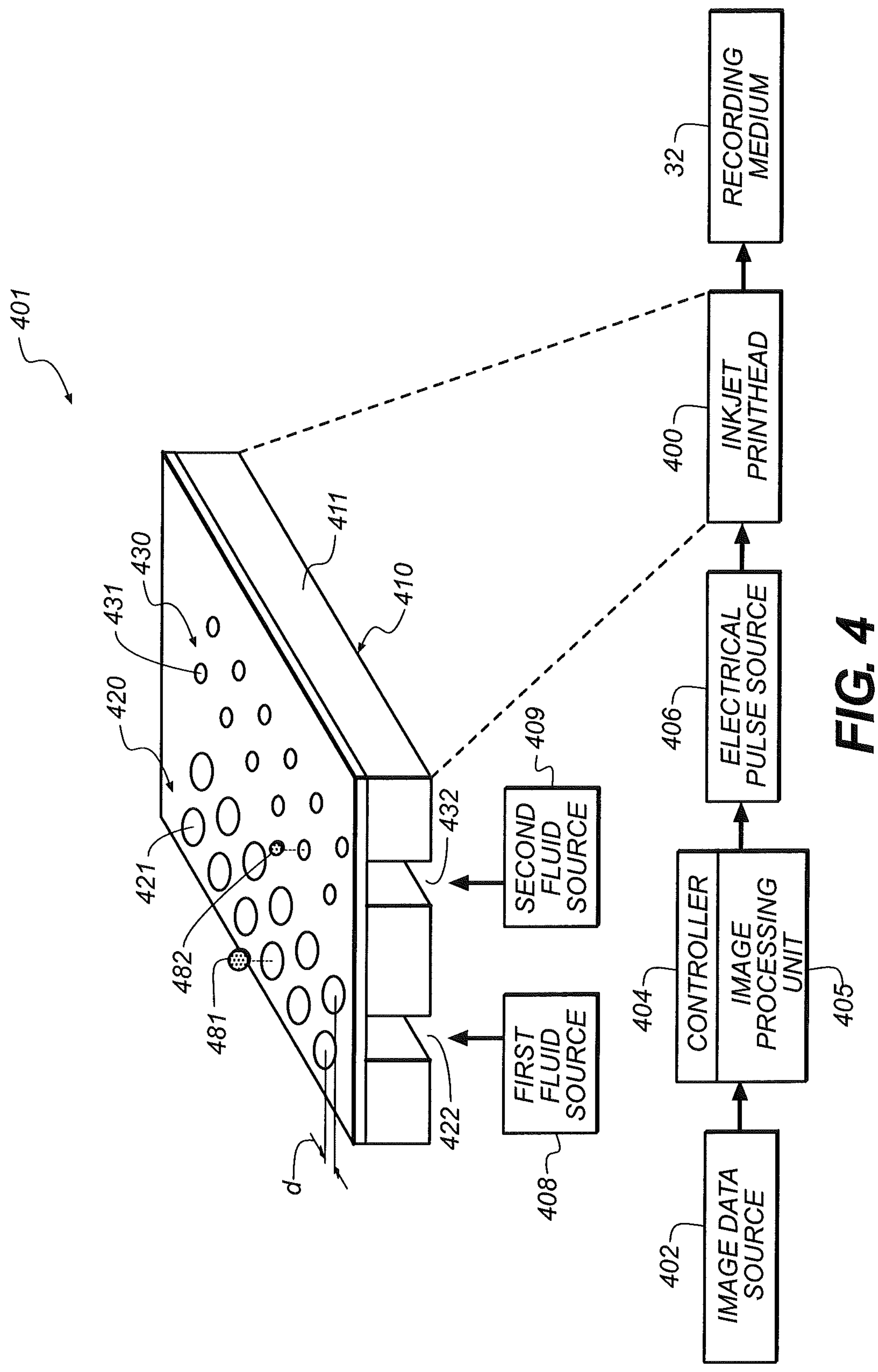
FIG. 4 is a schematic of a drop-on-demand inkjet printer system.

FIG. 4 is a schematic of a drop-on-demand inkjet printer system 401. Further details are provided in U.S. Pat. No. 7,350,902, the disclosure of which is incorporated herein by reference. Inkjet printer system 401 includes an image data source 402, which provides data signals that are interpreted by a controller 404 as being commands to eject drops. Controller 404 includes an image processing unit 405 for rendering images for printing, and outputs signals to an electrical pulse source 406. Electrical pulse source 406 produces electrical energy pulses that are inputted to an inkjet printhead 400 that includes at least one inkjet printhead die 410.

In the example shown in FIG. 4, there are two nozzle arrays. Nozzles 421 in the first nozzle array 420 have a larger opening area than nozzles 431 in the second nozzle array 430. In this example, each of the two nozzle arrays has two staggered rows of nozzles, each row having a nozzle density of 600 per inch. The effective nozzle density then in each array is 1200 per inch (i.e. spacing d=1/1200 inch in FIG. 4). If pixels on the recording medium 32 were sequentially numbered along the recording medium advance direction, the nozzles from one row of an array would print the odd numbered pixels, while the nozzles from the other row of the array would print the even numbered pixels.

In fluid communication with each nozzle array is a corresponding ink delivery pathway. Ink delivery pathway 422 is in fluid communication with the first nozzle array 420, and ink delivery pathway 432 is in fluid communication with the second nozzle array 430. Portions of ink delivery pathways 422 and 432 are shown in FIG. 4 as openings through printhead die substrate 411. One or more inkjet printhead die 410 are included in an inkjet printhead, but for greater clarity only one inkjet printhead die 410 is shown in FIG. 4. The printhead die are arranged on a support member. In FIG. 4, first fluid source 408 supplies ink to first nozzle array 420 via ink delivery pathway 422, and second fluid source 409 supplies ink to second nozzle array 430 via ink delivery pathway 432. Although distinct fluid sources 408 and 409 are shown, in some applications it can be beneficial to have a single fluid source supplying ink to both the first nozzle array 420 and the second nozzle array 430 via ink delivery pathways 422 and 432 respectively. Also, in some embodiments, fewer than two or more than two nozzle arrays can be included on printhead die 410. In some embodiments, all nozzles on inkjet printhead die 410 can be the same size, rather than having multiple sized nozzles on inkjet printhead die 410.

Not shown in FIG. 4 are the drop forming mechanisms associated with the nozzles. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 406 are sent to the various drop ejectors according to the desired deposition pattern. In the example of FIG. 4, droplets 481 ejected from the first nozzle array 420 are larger than droplets 482 ejected from the second nozzle array 430, due to the larger nozzle opening area. Typically other aspects of the drop forming mechanisms (not shown) associated respectively with nozzle arrays 420 and 430 are also sized differently in order to customize the drop ejection process for the different sized drops. During operation, droplets of ink are deposited on a recording medium 32.

An assembled drop-on-demand inkjet printhead (not shown) includes a plurality of printhead dice, each similar to printhead die 410, and electrical and fluidic connections to those dice. Each die includes one or more nozzle arrays, each connected to a respective ink source. In an example, three dice are used, each with two nozzle arrays, and the six nozzle arrays on a printhead are respectively connected to cyan, magenta, yellow, text black, and photo black inks, and a colorless protective printing fluid. Each of the six nozzle arrays is disposed along a nozzle array direction and can be ≤1 inch long. Typical lengths of recording media are 6 inches for photographic prints (4 inches by 6 inches) or 11 inches for paper (8.5 by 11 inches). Thus, in order to print a full image, a number of swaths are successively printed while moving the printhead across recording medium 32. Following the printing of a swath, the recording medium 32 is advanced along a media advance direction that is substantially parallel to the nozzle array direction.

Figure 5:
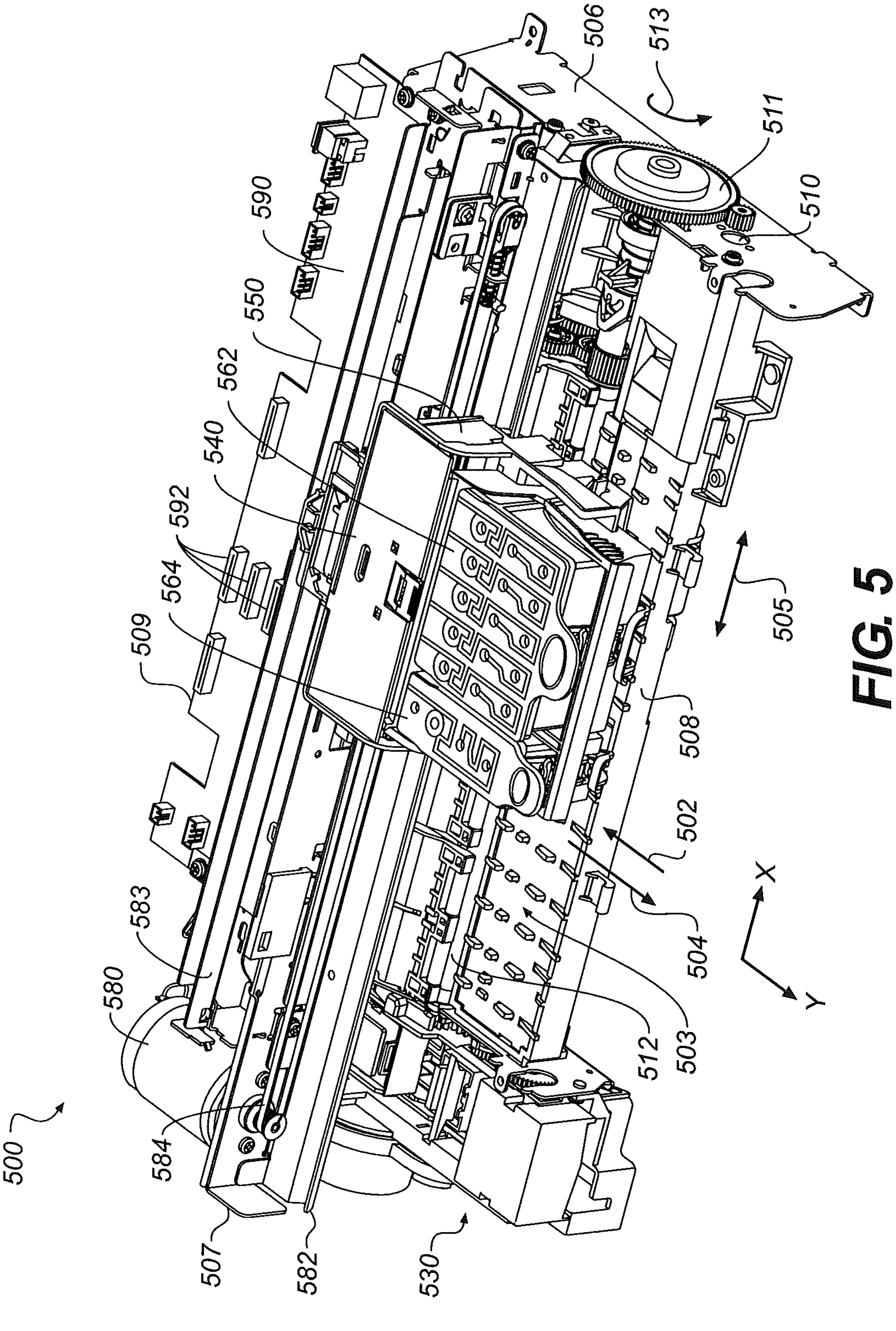
FIG. 5 is a perspective of a portion of a drop-on-demand inkjet printer.

FIG. 5 is a perspective of a portion of a drop-on-demand inkjet printer. Some of the parts of the printer have been hidden in the view shown in FIG. 5 so that other parts can be more clearly seen. Printer chassis 500 has a print region 503 across which carriage 540 is moved back and forth in carriage scan direction 505 along the X axis, between the right side 506 and left side 507 of printer chassis 500, while drops are ejected from printhead die 410 (not shown in FIG. 5) on printhead assembly 550 that is mounted on carriage 540. Carriage motor 580 moves belt 584 to move carriage 540 along carriage guide rail 582. An encoder sensor (not shown) is mounted on carriage 540 and indicates carriage location relative to an encoder fence 583.

Printhead assembly 550 is mounted in carriage 540, and multi-chamber ink tank 562 and single-chamber ink tank 564 are installed in printhead assembly 550. A printhead together with installed ink tanks is sometimes called a printhead assembly. The mounting orientation of printhead assembly 550 as shown here is such that the printhead die 410 are located at the bottom side of printhead assembly 550, the droplets of ink being ejected downward onto the recording medium (not shown) in print region 503 in the view of FIG. 5. Multi-chamber ink tank 562, in this example, contains five ink sources: cyan, magenta, yellow, photo black, and colorless protective fluid; while single-chamber ink tank 564 contains the ink source for text black. In other embodiments, rather than having a multi-chamber ink tank to hold several ink sources, all ink sources are held in individual single chamber ink tanks. Paper or other recording medium (sometimes generically referred to as paper or media herein) is loaded along paper load entry direction 502 toward front 508 of printer chassis 500.

A variety of rollers can be used to advance the recording medium through the printer. In an example, a pick-up roller (not shown) moves the top piece or sheet of a stack of paper or other recording medium in a paper load entry direction. A turn roller (not shown) acts to move the paper around a C-shaped path (in cooperation with a curved rear wall surface) so that the paper is oriented to advance along media advance direction 504 from rear 509 of printer chassis 500 (in the +Y direction of the Y axis). The paper is then moved by the feed roller and one or more idler roller(s) to advance along media advance direction 504 across print region 503, and from there to a discharge roller (not shown) and star wheel(s) so that printed paper exits along the media advance direction 504. Feed roller 512 includes a feed roller shaft along its axis, and feed roller gear 511 is mounted on the feed roller shaft. Feed roller 512 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller.

The motor that powers the paper advance rollers is not shown in FIG. 5. Hole 510 at right side 506 of the printer chassis 500 is where the motor gear (not shown) protrudes through in order to engage feed roller gear 511 and the gear for the discharge roller (not shown). For normal paper pick-up and feeding, it is desired that the rollers rotate together in forward rotation direction 513. Maintenance station 530 is located toward left side 507 of printer chassis 500.

Toward the rear 509 of the printer chassis 500, in this example, is located the electronics board 590, which includes cable connectors 592 for communicating via cables (not shown) to the printhead carriage 540 and from there to the printhead assembly 550. Also on the electronics board are mounted motor controllers for the carriage motor 580 and for the paper advance motor, a processor or other control electronics (shown schematically as controller 404 and image processing unit 405 in FIG. 4) for controlling the printing process, and an optional connector for a cable to a host computer.

The electrophotographic (EP) printing process can be embodied in devices including printers, copiers, scanners, and facsimiles, and analog or digital devices, all of which are referred to herein as "printers." Various aspects of the present invention are useful with electrostatographic printers such as electrophotographic printers that employ dry ink developed on an electrophotographic recording medium, and ionographic printers and copiers that do not rely upon an electrophotographic recording medium. Electrophotography and ionography are types of electrostatography (printing using electrostatic fields), which is a subset of electrography (printing using electric fields).

A digital reproduction printing system ("printer") typically includes a digital front-end processor (DFE), a print engine (also referred to in the art as a "marking engine") for applying dry ink to the recording medium, and one or more post-printing finishing system(s) (e.g. a UV coating system, a glosser system, or a laminator system). A printer can reproduce pleasing black-and-white or color onto a recording medium. A printer can also produce selected patterns of dry ink on a recording medium, which patterns (e.g. surface textures) do not correspond directly to a visible image. The DFE receives input electronic files (such as Postscript command files) composed of images from other input devices (e.g., a scanner, a digital camera). The DFE can include various function processors, e.g. a raster image processor (RIP), image positioning processor, image manipulation processor, color processor, or image storage processor. The DFE rasterizes input electronic files into image bitmaps for the print engine to print. In some embodiments, the DFE permits a human operator to set up parameters such as layout, font, color, media type, or post-finishing options. The print engine takes the rasterized image bitmap from the DFE and renders the bitmap into a form that can control the printing process from the exposure device to transferring the print image onto the recording medium. The finishing system applies features such as protection, glossing, or binding to the prints. The finishing system can be implemented as an integral component of a printer, or as a separate machine through which prints are fed after they are printed.

The printer can also include a color management system which captures the characteristics of the image printing process implemented in the print engine (e.g. the electrophotographic process) to provide known, consistent color reproduction characteristics. The color management system can also provide known color reproduction for different inputs (e.g. digital camera images or film images).

In an embodiment of an electrophotographic modular printing machine useful with various embodiments, e.g. the NEXPRESS 3000SE printer manufactured by Eastman Kodak Company of Rochester, N.Y., color-dry ink print images are made in a plurality of color imaging modules arranged in tandem, and the print images are successively electrostatically transferred to a recording medium adhered to a transport web moving through the modules. Colored dry inks include colorants, e.g. dyes or pigments, which absorb specific wavelengths of visible light. Commercial machines of this type typically employ intermediate transfer members in the respective modules for transferring visible images from the photoreceptor and transferring print images to the recording medium. In other electrophotographic printers, each visible image is directly transferred to a recording medium to form the corresponding print image.

Electrophotographic printers having the capability to also deposit clear dry ink using an additional imaging module are also known. As used herein, clear dry ink is considered to be a color of dry ink, as are C, M, Y, K, and Lk, but the term "colored dry ink" excludes clear dry inks. The provision of a clear-dry ink overcoat to a color print is desirable for providing protection of the print from fingerprints and reducing certain visual artifacts. Clear dry ink uses particles that are similar to the dry ink particles of the color development stations but without colored material (e.g. dye or pigment) incorporated into the dry ink particles. However, a clear-dry ink overcoat can add cost and reduce color gamut of the print; thus, it is desirable to provide for operator/user selection to determine whether or not a clear-dry ink overcoat will be applied to the entire print. A uniform layer of clear dry ink can be provided. A layer that varies inversely according to heights of the dry ink stacks can also be used to establish level dry ink stack heights. The respective dry inks are deposited one upon the other at respective locations on the recording medium and the height of a respective dry ink stack is the sum of the dry ink heights of each respective color. Uniform stack height provides the print with a more even or uniform gloss.

Figure 6:
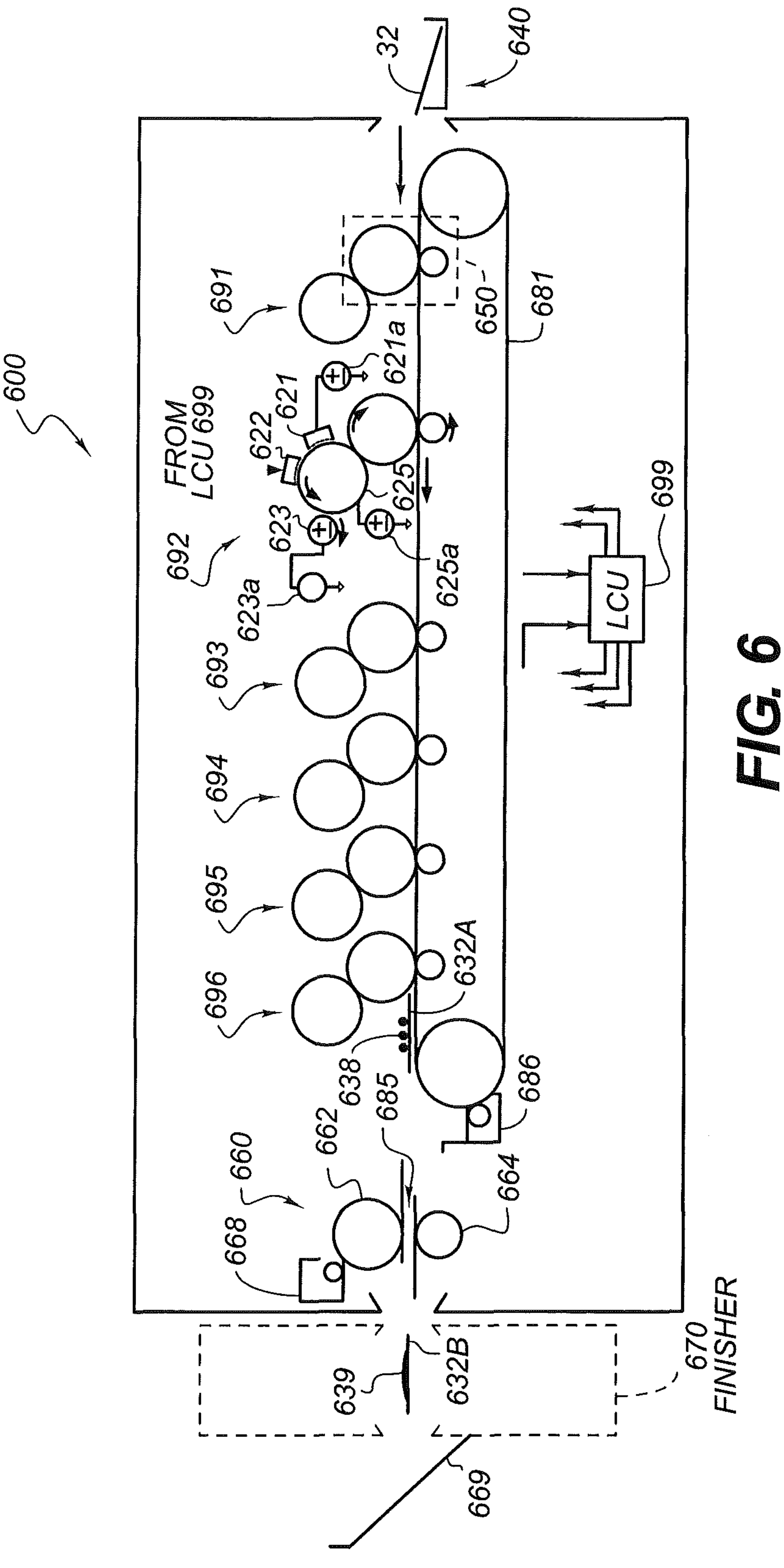
FIG. 6 is an elevational cross-section of an electrophotographic reproduction apparatus.

FIG. 6 is an elevational cross-section of an electrophotographic reproduction apparatus. Printer 600 is adapted to produce print images, such as single-color (monochrome), CMYK, or hexachrome (six-color) images, on a recording medium (multicolor images are also known as "multi-component" images). Images can include text, graphics, photos, and other types of visual content. One embodiment involves printing using an electrophotographic print engine having six sets of single-color image-producing or -printing stations or modules arranged in tandem, but more or fewer than six colors can be combined to form a print image on a given recording medium. Other electrophotographic writers or printer apparatus can also be included. Various components of printer 600 are shown as rollers; other configurations are also possible, including belts.

Referring to FIG. 6, printer 600 is an electrophotographic printing apparatus having a number of tandemly-arranged electrophotographic image-forming printing modules 691, 692, 693, 694, 695, 696, also known as electrophotographic imaging subsystems. Each printing module produces a single-color dry ink image for transfer using a respective transfer subsystem 650 (for clarity, only one is labeled) to a recording medium 32 successively moved through the modules. Recording medium 32 is transported from supply unit 640, which can include active feeding subsystems as known in the art, into printer 600. In various embodiments, the visible image can be transferred directly from an imaging roller to a recording medium, or from an imaging roller to one or more transfer roller(s) or belt(s) in sequence in transfer subsystem 650, and thence to recording medium 32. Recording medium 32 is, for example, a selected section of a web of, or a cut sheet of, planar media such as paper or transparency film.

Each printing module 691, 692, 693, 694, 695, 696 includes various components. For clarity, these are only shown in printing module 692. Around photoreceptor 625 are arranged, ordered by the direction of rotation of photoreceptor 625, charger 621, exposure subsystem 622, and toning station 623.

In the EP process, an electrostatic latent image is formed on photoreceptor 625 by uniformly charging photoreceptor 625 and then discharging selected areas of the uniform charge to yield an electrostatic charge pattern corresponding to the desired image (a "latent image"). Charger 621 produces a uniform electrostatic charge on photoreceptor 625 or its surface. Exposure subsystem 622 selectively image-wise discharges photoreceptor 625 to produce a latent image. Exposure subsystem 622 can include a laser and raster optical scanner (ROS), one or more LEDs, or a linear LED array.

After the latent image is formed, charged dry ink particles are brought into the vicinity of photoreceptor 625 by toning station 623 and are attracted to the latent image to develop the latent image into a visible image. Note that the visible image may not be visible to the naked eye depending on the composition of the dry ink particles (e.g. clear dry ink). Toning station 623 can also be referred to as a development station. Dry ink can be applied to either the charged or discharged parts of the latent image.

After the latent image is developed into a visible image on the photoreceptor, a suitable recording medium is brought into juxtaposition with the visible image. In transfer subsystem 650, a suitable electric field is applied to transfer the dry ink particles of the visible image to the recording medium to form the desired print image on the recording medium. The imaging process is typically repeated many times with reusable photoreceptors.

The recording medium is then removed from its operative association with the photoreceptor and subjected to heat or pressure to permanently fix ("fuse") the print image to the recording medium. Plural print images, e.g. of separations of different colors, are overlaid on one recording medium before fusing to form a multi-color print image on the recording medium.

Each recording medium, during a single pass through the six modules, can have transferred in registration thereto up to six single-color dry ink images to form a pentachrome image. As used herein, the term "hexachrome" implies that in a print image, combinations of various of the six colors are combined to form other colors on the recording medium at various locations on the recording medium. That is, each of the six colors of dry ink can be combined with dry ink of one or more of the other colors at a particular location on the recording medium to form a color different than the colors of the dry inks combined at that location. In an embodiment, printing module 691 forms black (K) print images, printing module 692 forms yellow (Y) print images, printing module 693 forms magenta (M) print images, printing module 694 forms cyan (C) print images, printing module 695 forms light-black (Lk) images, and printing module 696 forms clear images.

In various embodiments, printing module 696 forms a print image using a clear dry ink or tinted dry ink. Tinted dry inks absorb less light than they transmit, but do contain pigments or dyes that move the hue of light passing through them towards the hue of the tint. For example, a blue-tinted dry ink coated on white paper will cause the white paper to appear light blue when viewed under white light, and will cause yellows printed under the blue-tinted dry ink to appear slightly greenish under white light.

Recording medium 632A is shown after passing through printing module 696. Print image 638 on recording medium 632A includes unfused dry ink particles.

Subsequent to transfer of the respective print images, overlaid in registration, one from each of the respective printing modules 691, 692, 693, 694, 695, 696, recording medium 632A is advanced to a fuser 660, i.e. a fusing or fixing assembly, to fuse print image 638 to recording medium 632A. Transport web 681 transports the print-image-carrying recording media to fuser 660, which fixes the dry ink particles to the respective recording media by the application of heat and pressure. The recording media are serially de-tacked from transport web 681 to permit them to feed cleanly into fuser 660. Transport web 681 is then reconditioned for reuse at cleaning station 686 by cleaning and neutralizing the charges on the opposed surfaces of the transport web 681. A mechanical cleaning station (not shown) for scraping or vacuuming dry ink off transport web 681 can also be used independently or with cleaning station 686. The mechanical cleaning station can be disposed along transport web 681 before or after cleaning station 686 in the direction of rotation of transport web 681.

Fuser 660 includes a heated fusing roller 662 and an opposing pressure roller 664 that form a fusing nip 665 therebetween. In an embodiment, fuser 660 also includes a release fluid application substation 668 that applies release fluid, e.g. silicone oil, to fusing roller 662. Alternatively, wax-containing dry ink can be used without applying release fluid to fusing roller 662. Other embodiments of fusers, both contact and non-contact, can be employed with various embodiments. For example, solvent fixing uses solvents to soften the dry ink particles so they bond with the recording medium. Photoflash fusing uses short bursts of high-frequency electromagnetic radiation (e.g. ultraviolet light) to melt the dry ink. Radiant fixing uses lower-frequency electromagnetic radiation (e.g. infrared light) to more slowly melt the dry ink. Microwave fixing uses electromagnetic radiation in the microwave range to heat the recording media (primarily), thereby causing the dry ink particles to melt by heat conduction, so that the dry ink is fixed to the recording medium.

The recording media (e.g. recording medium 632B) carrying the fused image (e.g., fused image 639) are transported in a series from the fuser 660 along a path either to a remote output tray 669, or back to printing modules 691, 692, 693, 694, 695, 696 to create an image on the backside of the recording medium, i.e. to form a duplex print. Recording media can also be transported to any suitable output accessory. For example, an auxiliary fuser or glossing assembly can provide a clear-dry ink overcoat. Printer 600 can also include multiple fusers 660 to support applications such as overprinting, as known in the art.

In various embodiments, between fuser 660 and output tray 669, recording medium 632B passes through finisher 670. Finisher 670 performs various media-handling operations, such as folding, stapling, saddle-stitching, collating, and binding.

Printer 600 includes main printer apparatus logic and control unit (LCU) 699, which receives input signals from the various sensors associated with printer 600 and sends control signals to the components of printer 600. LCU 699 can include a microprocessor incorporating suitable look-up tables and control software executable by the LCU 699. It can also include a field-programmable gate array (FPGA), programmable logic device (PLD), microcontroller, or other digital control system. LCU 699 can include memory for storing control software and data. Sensors associated with the fusing assembly provide appropriate signals to the LCU 699. In response to the sensors, the LCU 699 issues command and control signals that adjust the heat or pressure within fusing nip 665 and other operating parameters of fuser 660 for recording media. This permits printer 600 to print on recording media of various thicknesses and surface finishes, such as glossy or matte.

Image data for writing by printer 600 can be processed by a raster image processor (RIP; not shown), which can include a color separation screen generator or generators. The output of the RIP can be stored in frame or line buffers for transmission of the color separation print data to each of respective LED writers, e.g. for black (K), yellow (Y), magenta (M), cyan (C), and red (R), respectively. The RIP or color separation screen generator can be a part of printer 600 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Various parameters of the components of a printing module (e.g., printing module 691) can be selected to control the operation of printer 600. In an embodiment, charger 621 is a corona charger including a grid between the corona wires (not shown) and photoreceptor 625. Voltage source 621*a* applies a voltage to the grid to control charging of photoreceptor 625. In an embodiment, a voltage bias is applied to toning station 623 by voltage source 623*a* to control the electric field, and thus the rate of dry ink transfer, from toning station 623 to photoreceptor 625. In an embodiment, a voltage is applied to a conductive base layer of photoreceptor 625 by voltage source 625*a* before development, that is, before dry ink is applied to photoreceptor 625 by toning station 623. The applied voltage can be zero; the base layer can be grounded. This also provides control over the rate of dry ink deposition during development. In an embodiment, the exposure applied by exposure subsystem 622 to photoreceptor 625 is controlled by LCU 699 to produce a latent image corresponding to the desired print image. All of these parameters can be changed, as described below.

Further details regarding printer 600 are provided in U.S. Pat. No. 6,608,641, issued on Aug. 19, 2003, to Peter S. Alexandrovich et al., and in U.S. Publication No. 2006/0133870, published on Jun. 22, 2006, by Yee S. Ng et al., the disclosures of which are incorporated herein by reference.

Figure 7:
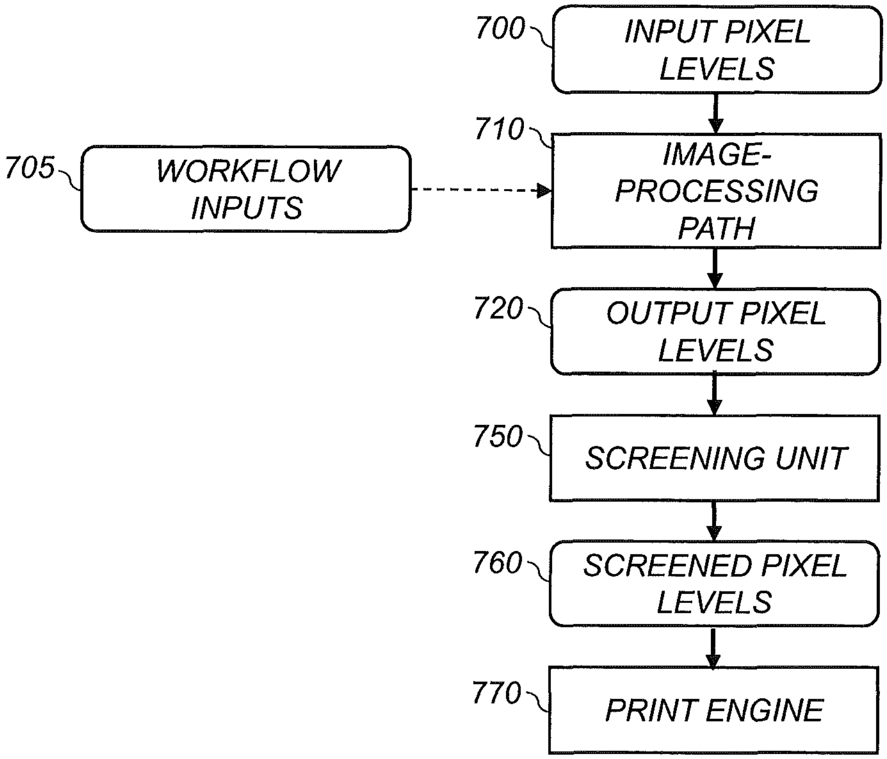
FIG. 7 is a schematic of a data-processing path useful with various embodiments.

FIG. 7 is a schematic of a data-processing path useful with various embodiments, and defines several terms used herein. Continuous printing system 20 (FIG. 1), inkjet printer system 401 (FIG. 4), printer 600 (FIG. 6), or electronics corresponding to any of these (e.g. the DFE or RIP, described herein), can operate this datapath to produce image data corresponding to exposure to be applied to a photoreceptor, as described above. This data path can also provide data for other types of printers. The data path can be partitioned in various ways between the DFE and the print engine, as is known in the image-processing art.

The following discussion relates to a single pixel; in operation, data processing takes place for a plurality of pixels that together compose an image. The term "resolution" herein refers to spatial resolution, e.g. in cycles per degree. The term "bit depth" refers to the range and precision of values. Each set of pixel levels has a corresponding set of pixel locations. Each pixel location is the set of coordinates on the surface of recording medium 32 (FIG. 6) at which an amount of dry ink corresponding to the respective pixel level should be applied.

Printer 600 receives input pixel levels 700. These can be any level known in the art, e.g. sRGB code values (0 . . . 255) for red, green, and blue (R, G, B) color channels. There is one pixel level for each color channel. Input pixel levels 700 can be in an additive or subtractive space. Image-processing path 710 converts input pixel levels 700 to output pixel levels 720, which can be cyan, magenta, yellow (CMY); cyan, magenta, yellow, black (CMYK); or values in another subtractive color space. This conversion can be part of the color-management system discussed above. Output pixel level 720 can be linear or non-linear with respect to exposure, L*, or other factors known in the art.

Image-processing path 710 transforms input pixel levels 700 of input color channels (e.g. R) in an input color space (e.g. sRGB) to output pixel levels 720 of output color channels (e.g. C) in an output color space (e.g. CMYK). In various embodiments, image-processing path 710 transforms input pixel levels 700 to desired CIELAB (CIE 1976 L*a*b*; CIE Pub. 15:2004, 3rd. ed., §8.2.1) values or ICC PCS (Profile Connection Space) LAB values, and thence optionally to values representing the desired color in a wide-gamut encoding such as ROMM RGB. The CIELAB, PCS LAB or ROMM RGB values are then transformed to device-dependent CMYK values to maintain the desired colorimetry of the pixels. Image-processing path 710 can use optional workflow inputs 705, e.g. ICC profiles of the image and the printer 600, to calculate the output pixel levels 720. RGB can be converted to CMYK according to the Specifications for Web Offset Publications (SWOP; ANSI CGATS TR001 and CGATS.6), Euroscale (ISO 2846-1:2006 and ISO 12647), or other CMYK standards.

Input pixels are associated with an input resolution in pixels per inch (ippi, input pixels per inch), and output pixels with an output resolution (oppi). Image-processing path 710 scales or crops the image, e.g. using bicubic interpolation, to change resolutions when ippi≠oppi. The following steps in the path (output pixel levels 720, screened pixel levels 760) are preferably also performed at oppi, but each can be a different resolution, with suitable scaling or cropping operations between them.

Screening unit 750 calculates screened pixel levels 760 from output pixel levels 720. Screening unit 750 can perform continuous-tone (processing), halftone, multitone, or multi-level halftone processing, and can include a screening memory or dither bitmaps. Screened pixel levels 760 are at the bit depth required by print engine 770.

Print engine 770 represents the subsystems in printer 600 that apply an amount of dry ink corresponding to the screened pixel levels to a recording medium 32 (FIG. 6) at the respective screened pixel locations. Examples of these subsystems are described above with reference to FIGS. 1-3. The screened pixel levels and locations can be the engine pixel levels and locations, or additional processing can be performed to transform the screened pixel levels and locations into the engine pixel levels and locations.

Figure 8:
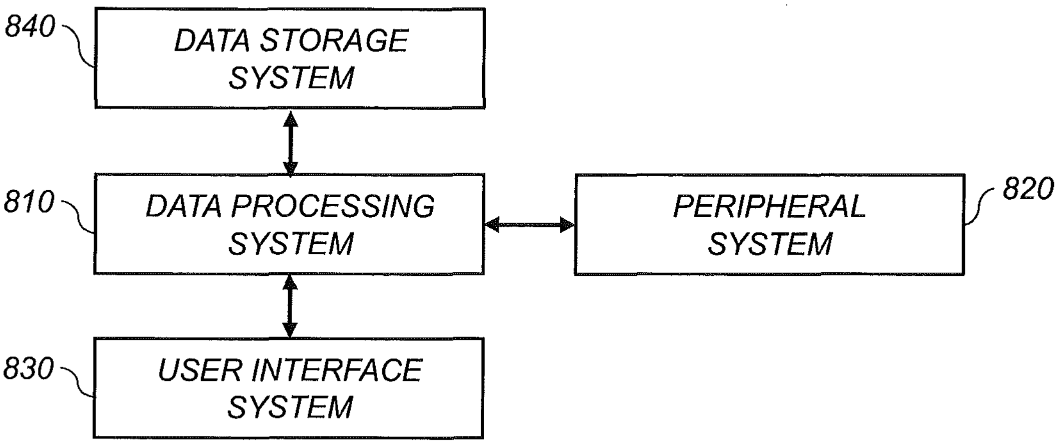
FIG. 8 is a high-level diagram showing the components of a processing system useful with various embodiments.

FIG. 8 is a high-level diagram showing the components of a processing system useful with various embodiments. The system includes a data processing system 810, a peripheral system 820, a user interface system 830, and a data storage system 840. Peripheral system 820, user interface system 830 and data storage system 840 are communicatively connected to data processing system 810.

Data processing system 810 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 840 includes one or more processor-accessible memories configured to store information, including the information needed to execute the processes of the various embodiments, including the example processes described herein. Data storage system 840 can be a distributed processor-accessible memory system including multiple processor-accessible memories communicatively connected to data processing system 810 via a plurality of computers or devices. On the other hand, data storage system 840 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 840 is shown separately from data processing system 810, one skilled in the art will appreciate that data storage system 840 can be stored completely or partially within data processing system 810. Further in this regard, although peripheral system 820 and user interface system 830 are shown separately from data processing system 810, one skilled in the art will appreciate that one or both of such systems can be stored completely or partially within data processing system 810.

Peripheral system 820 can include one or more devices configured to provide digital content records to data processing system 810. For example, peripheral system 820 can include digital still cameras, digital video cameras, cellular phones, or other data processors. Data processing system 810, upon receipt of digital content records from a device in peripheral system 820, can store such digital content records in data storage system 840. Peripheral system 820 can also include a printer interface for causing a printer to produce output corresponding to digital content records stored in data storage system 840 or produced by data processing system 810.

User interface system 830 can include a mouse, a keyboard, another computer, or any device or combination of devices from which data is input to data processing system 810. In this regard, although peripheral system 820 is shown separately from user interface system 830, peripheral system 820 can be included as part of user interface system 830.

User interface system 830 also can include a display device, a processor-accessible memory, or any device or combination of devices to which data is output by data processing system 810. In this regard, if user interface system 830 includes a processor-accessible memory, such memory can be part of data storage system 840 even though user interface system 830 and data storage system 840 are shown separately in FIG. 8.

FIGS. 9A-9F show various stages of an interaction between an inkjet droplet on porous recording medium 32 and dry ink deposited on the droplet. In this and subsequent figures, the relative shading of various parts shows an example of diffusion of colorant between those parts. It is not required that colorant be present unless explicitly stated.

Figure 9A:
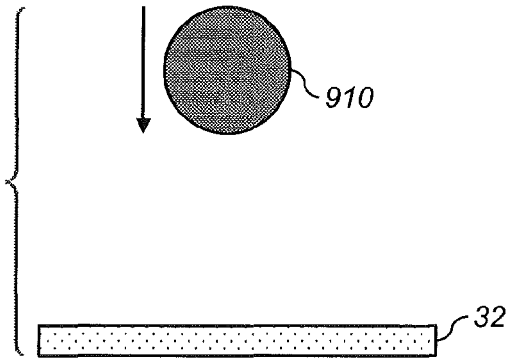
FIGS. 9A-9F show various stages of an interaction between an inkjet droplet on a porous recording medium and dry ink deposited on the droplet.

FIG. 9A shows inkjet drop 910 being jetted towards porous recording medium 32. FIG. 9B shows the inkjet drop coming into contact with the recording medium. As shown, some of the drop penetrates or soaks into the recording medium. FIG. 9C shows the drop after further soaking into the recording medium.

Figure 9D:
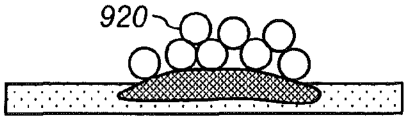
Figure 9B:
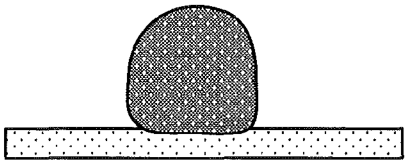

FIG. 9D shows dry ink particles 920 deposited on the ink. In various embodiments, the dry ink particles are smaller than the drop. This permits precise registration and avoids image spread into dry ink that would be deposited outside the drop if the dry ink were larger than or comparable in size to the drop. The dry ink can be clear and can have an open-cell porous structure to permit fluid and colorant to be absorbed into the dry ink particles.

Figure 9E:
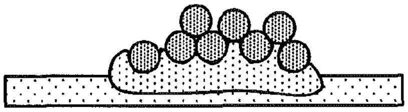
Figure 9C:
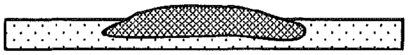

FIG. 9E shows ink being drawn between and, if porous dry ink, into the dry ink particles. Colorant can also be drawn from the ink into the dry ink particles.

Figure 9F:
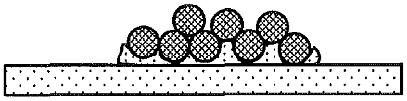

FIG. 9F shows a result of the dry ink's having absorbed enough ink to pull moisture out of the recording medium. To enhance the absorption of the hydrophilic ink into the dry ink, the dry ink can contain nanometer-sized clusters of hydrophilic particulate addenda such as hydrophilic silica, calcium oxide, calcium carbonate, magnesium oxide, and calcium chloride. A "nanometer-sized cluster" is a particle or clusters of particles having diameters of less than approximately 200 nm, as determined by inspection with either a scanning electron microscope (SEM) or a transmission electron microscope (TEM).

FIGS. 10A-10G show various stages of an interaction between an inkjet droplet on semiporous recording medium 32 and dry ink deposited on the droplet 910. A semiporous recording medium is defined as a recording medium upon which a droplet of water comparable in size to that used in measuring the surface energy of a surface using a contact angle goniometer is deposited onto a surface and, after 2 s at least some, but not all, of the droplet is still visible through the telescope of the contact angle goniometer, because some of the mass of the droplet has been absorbed into the semiporous recording medium. A porous recording medium is defined as a recording medium upon which a droplet of water comparable in size to that used in measuring the surface energy of a surface using a contact angle goniometer is deposited onto a surface and, after 2 s none of the droplet is still visible through the telescope of the contact angle goniometer. By comparison, a nonporous recording medium is a recording medium upon which, a droplet of water comparable in size to that used in measuring the surface energy of a surface using a contact angle goniometer having been deposited onto its surface, all of the deposited droplet except for that mass that has evaporated away is still visible through the telescope of the contact angle goniometer 2 sec. after deposition.

Figure 10A:
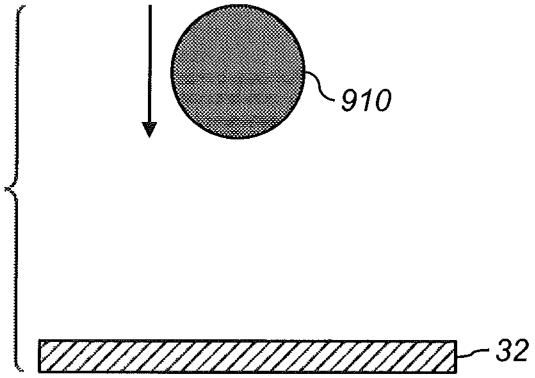
FIGS. 10A-10G show various stages of an interaction between an inkjet droplet on a semiporous recording medium and dry ink deposited on the droplet.

FIG. 10A shows drop 910 falling towards recording medium 32. FIG. 10B shows the drop coming into contact with the recording medium. A slight penetration of the drop into the recording medium is shown. FIG. 10C shows the drop spreading out on the recording medium. Penetration of the liquid into the recording medium is very limited.

Figure 10D:
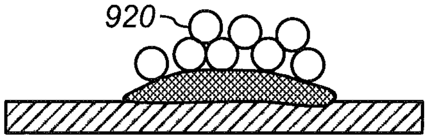
Figure 10B:
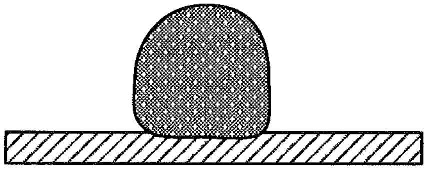

FIG. 10D shows dry ink particles 920 deposited on the spread-out ink on the recording medium. As discussed above, the dry ink particles can be smaller than the drop.

Figure 10E:
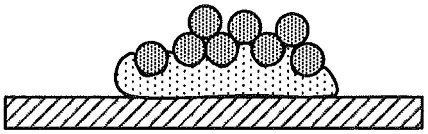
Figure 10C:
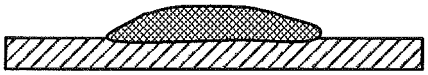
Figure 10F:
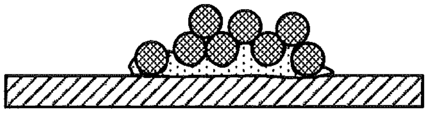
Figure 10G:

FIG. 10E shows ink being drawn between and, if porous dry ink, into the deposited dry ink particles. FIG. 10F shows an example in which the dry ink has drawn up enough ink or liquid to permit the at least some of the dry ink to contact the recording medium. FIG. 10G shows pigmented ink left on the recording medium after dry ink particles are removed.

Figure 11:
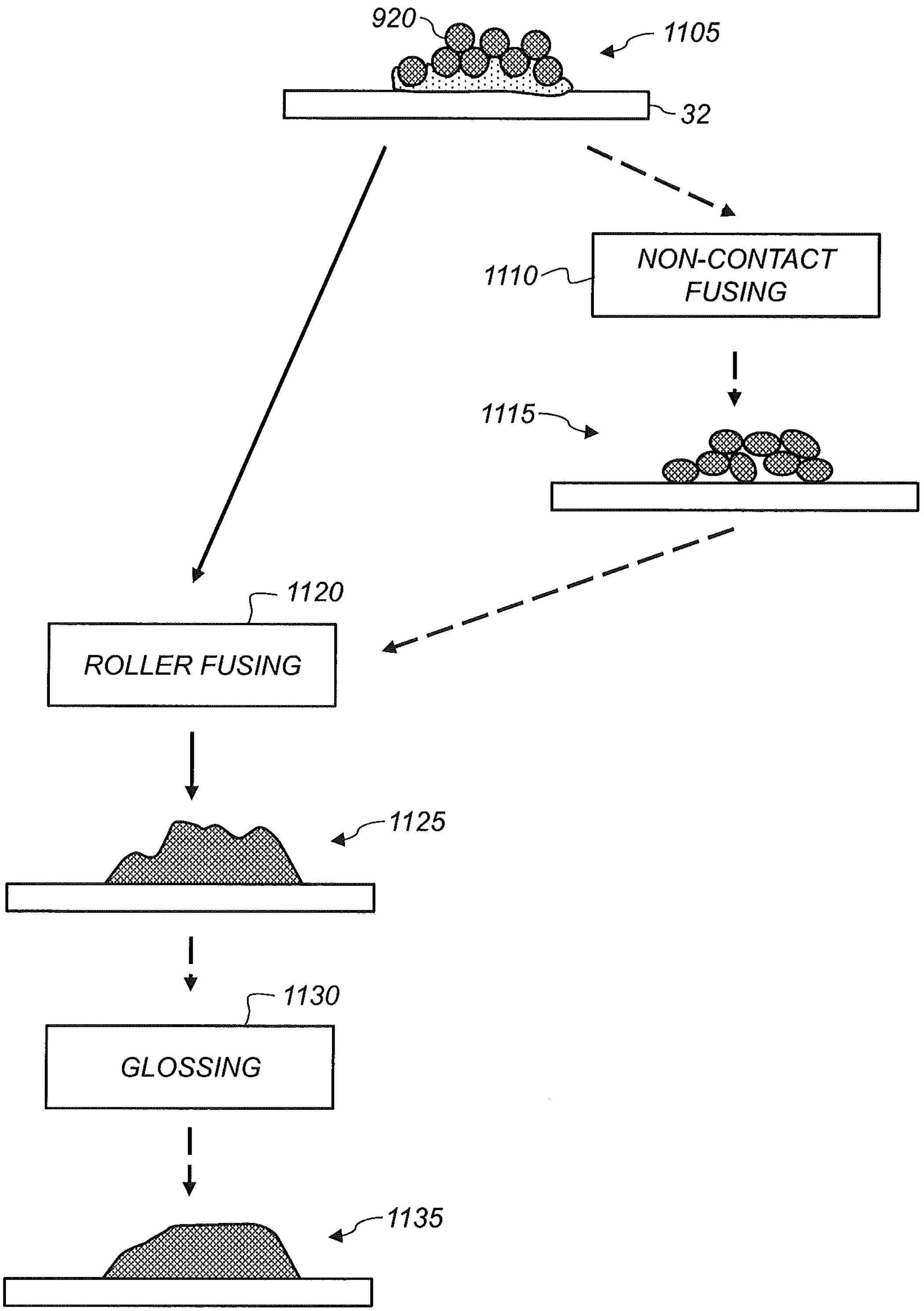
FIG. 11 shows effects on dry ink piles of various types of fixing.

FIG. 11 shows effects on dry ink piles of various types of fusing. FIG. 11 also shows an example of the effects of various finishing processes on dry ink that has been deposited to ink. These effects are similar for porous and nonporous recording media. Recording medium 32 with print image 1105 thereon corresponds to FIG. 9F or FIG. 10F. Print image 1105 includes ink and dry ink. Dashed arrows indicate optional steps.

In an embodiment, recording medium 32 is passed through a roller fusing step 1120 to produce fused image 1125. Recording medium 32 can further be passed through glossing step 1130 to produce glossed image 1135. Glossing step 1130 smooths out the peaks and valleys in fused image 1125.

In another embodiment, recording medium 32 is passed through a non-contact fusing step 1110 to produce tacked image 1115. Non-contact fusing can soften dry ink particles, causing them to compact together and flatten out. Recording medium 32 with tacked image 1115 can optionally be passed through roller fusing step 1120 or glossing step 1130, as described above.

Figure 12:
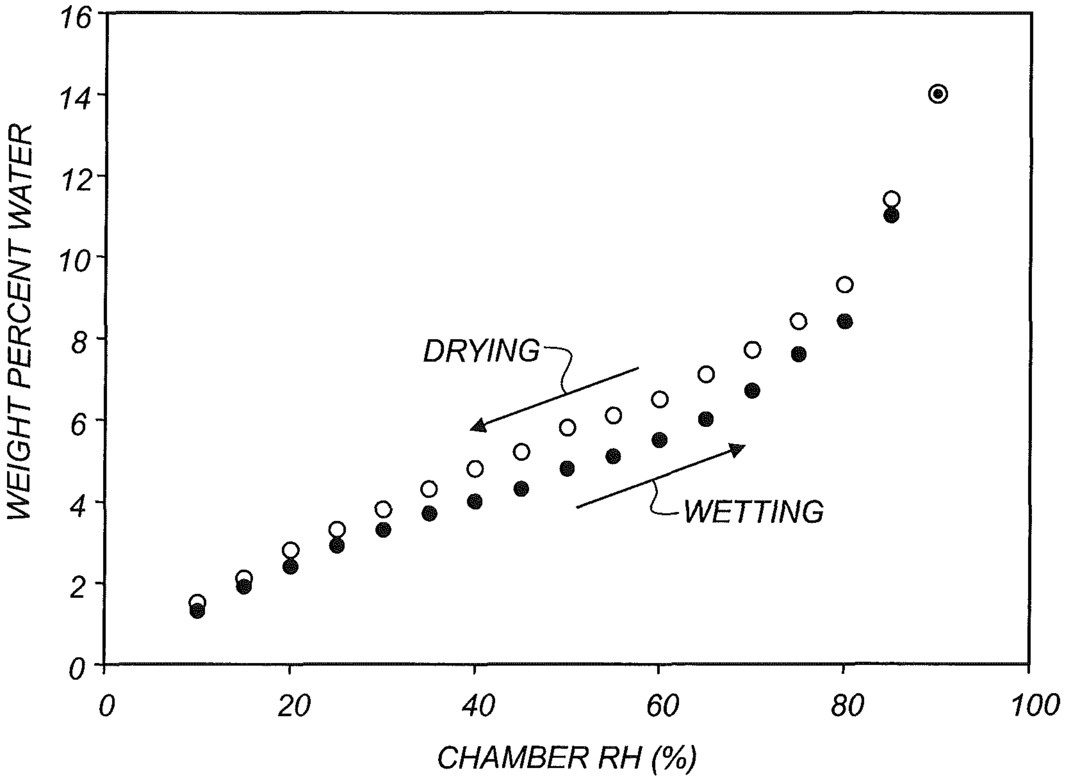
FIG. 12 shows the moisture content of paper equilibrated to the relative humidity.

FIG. 12 shows the moisture content of a selected representative paper, measured in weight percent of water, as a function of atmospheric relative humidity (RH), measured in percent. To take these measurements, the paper was placed in a chamber containing air at low RH. The moisture content of the chamber was increased in a series of steps. At each step, the paper was left in the chamber for enough time to permit it to equilibrate with the atmosphere in the chamber. The moisture content of the paper was measured. The resulting data are shown in the solid circles ("wetting"). After reaching a high RH, the chamber RH was reduced stepwise. As before, at each step the paper was permitted to equilibrate, then was measured. The resulting data are shown in the open circles ("drying"). As shown, there is some hysteresis in the moisture content.

Figure 13:
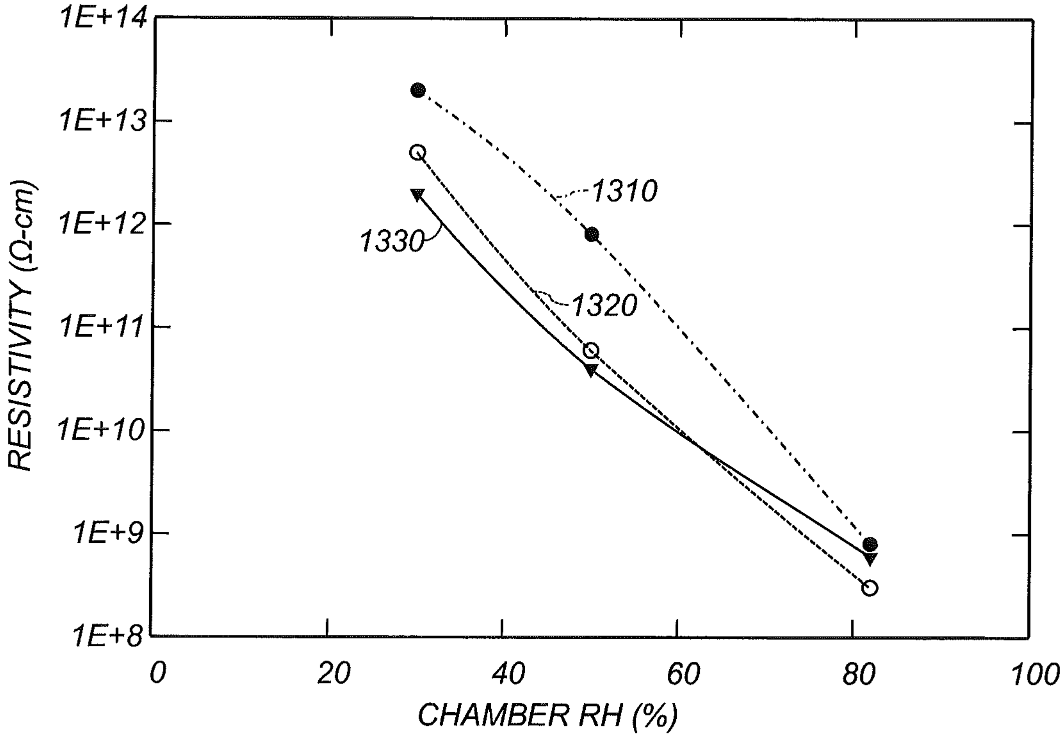
FIG. 13 shows the electrical resistivity of three types of paper as a function of the relative humidity.

FIG. 13 shows the electrical resistivity (Ω-cm) of three types of paper as a function of atmospheric relative humidity, as defined above with reference to FIG. 12. The abscissa is chamber RH and the ordinate is resistivity, plotted on a $\log_{10}$ scale from 100 MΩ to 100 TΩ. Curve 1310 is for a 60-lb. (60#) KROMEKOTE paper, curve 1320 is for a 70# POTLATCH VINTAGE paper, and curve 1330 is for a 20# UNISOURCE bond paper. As RH increases from under 40% to over 80%, resistivity drops by three to four orders of magnitude.

As a result of this resistivity, low-equilibrated-RH (e.g., dry) paper can hold an electric charge. If electric charge is deposited onto an electrically grounded material, an electrically leaky capacitor is formed. The electric charge will exponentially decay with a time constant t given by the product of the resistivity of the material and the dielectric constant of the material. In a period equal to one time constant, the charge and resulting potential on the material will decay to 1/e or approximately 1/2.7 (≈37%) of its initial value (e=ln(1)). In a period 5τ long, 99.3% of the charge and potential will dissipate. The dielectric constant of paper is approximately 3 times the permittivity of free space or ~3× ($8.85\times10^{-12}$) F/m. As shown in FIG. 13, the resistivity of paper whose moisture content is equilibrated to 50% RH is approximately $1\times10^{11}$ Ω-cm or $1\times10^{9}$ Ω-m. Thus, τ≈0.027 s, so in 0.13 s 99.7% of the charge deposited on paper whose moisture content is equilibrated to 50% RH will be dissipated. However, if the paper is dried to a moisture content equilibrated to 20% RH, the resistivity increases to between $10^{12}$ and $10^{14}$ Ω-cm. For a resistivity of $10^{13}$ Ω-cm=$10^{11}$ Ω-m, τ≈267 s, so the charge and resulting voltage on the recording medium would only decay by 3.7% in ten seconds. In various embodiments described below, paper is dried to an equilibrated RH providing sufficient resistivity that the amount of discharge in ten seconds is acceptable.

Figure 14:
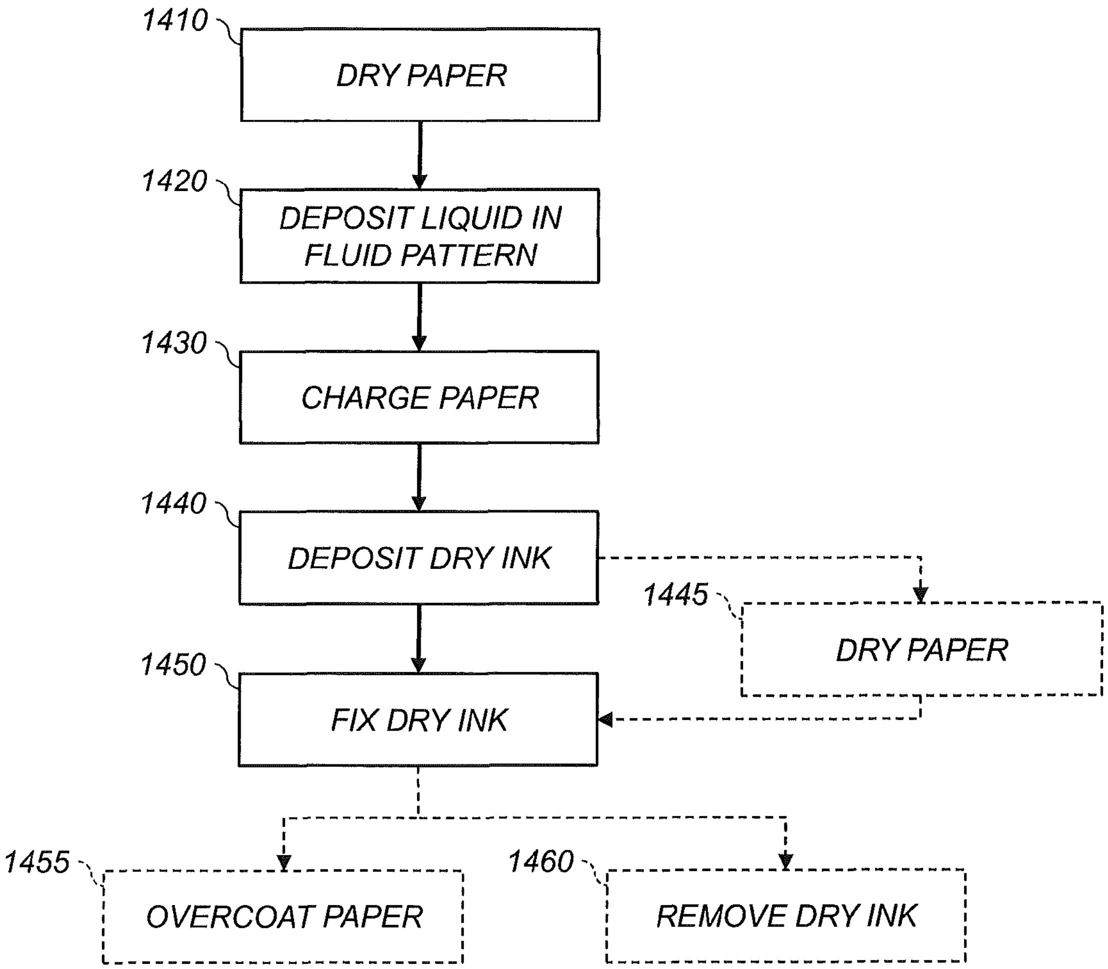
FIG. 14 is a flowchart of a method of producing a print on paper.

FIG. 14 shows a method of producing a print on paper, and specifically on a semiporous recording medium, e.g., as discussed above with reference to FIG. 10. Processing begins with step 1410. In step 1410, a selected region of the sheet or web of paper is dried to a moisture content not to exceed that of the paper equilibrated to 20% RH. This increases the electrical resistivity of the paper so that it will retain an electric charge for a sufficient time as to permit dry ink to be deposited onto the paper, as discussed above with reference to FIGS. 12-13.

In various embodiments, the paper is dried by letting it rest in dry air until it equilibrates, e.g., by holding the paper in an environmental chamber or by passing the paper through a container holding a desiccant such as calcium chloride. In other embodiments, the paper is dried by heating. Noncontact heating devices spaced apart from the paper, such as heated membranes, heated wires, or radiant sources of microwave, IR, or RF energy, can be used. The paper can also be heated through contact with a heated member such as a hot plate or heated roller. The paper is preferably heated to at least 110° C. and is preferably not heated to a temperature that will cause degradation of the paper, e.g., blistering, yellowing, embrittlement, or burning. Step 1410 is followed by step 1420.

In step 1420, hydrophilic liquid is deposited in a selected fluid pattern on all or part of the selected region of the paper within 15 seconds after the completion of drying. The deposited hydrophilic liquid (e.g., ink) wets an image area of the paper corresponding to the selected fluid pattern. A device such as an inkjet printer, as discussed above, can be used to deposit the liquid. The fluid pattern can be deposited in an image-wise manner. The hydrophilic liquid can include water as a solvent, or can include other hydrophilic liquids such as alcohols with 4 or fewer carbons such as methanol, isopropanol, ethanol, propanol, butanol, or glycol. The "front" of the paper is defined as that face of the paper on which the liquid is deposited; the "back" of the paper is the other face. The roles of "front" and "back" are reversed in the second pass of a duplex print through a printer.

In various embodiments, the hydrophilic liquid is an ink or other liquid containing colorant. The colorant in the liquid can be a pigment in a stable colloidal suspension. This requires that the pigment be sufficiently electrically charged to remain stable. More specifically, the pigments are charged at a first polarity, thereby producing a so-called electrical double layer of counter charge in the solvent. A suitable parameter to characterize the charge of the pigment is the zeta potential, as is known in the literature and measurable using commercially available devices. In other embodiments, the colorant is a dye dissolved or suspended in the liquid.

In various embodiments, the hydrophilic liquid includes colorant and the dry ink does not include colorant. This embodiment can be useful for producing inkjet prints with effects, such as a glossy surface or raised-letter (tactile) printing. The inkjet image can be produced using colored inks, and clear dry ink particles can be applied to provide the finish or texture.

In various embodiments, the dry ink can include dry ink particles having diameters between 4 μm and 25 μm.

In various embodiments, the paper has a semiporous surface. Papers with such a surface include as graphic arts papers with a clay coating, e.g., Warren Offset Enamel, Potlatch Vintage Gloss, Potlatch Vintage Velvet, or Kromekote. Only a small amount of the hydrophilic liquid soaks into the semiporous paper, as shown in FIG. 10C.

Nonporous papers, e.g., TESLIN, a microvoided polymeric material, or polyethylene coated paper stock (used in photofinishing applications and designed to be submerged in aqueous solutions during a silver halide development process) are not suitable for use with this method. Papers and other types of substrates into the surface of which the hydrophilic liquid can penetrate, and in which resistivity is correlated with moisture content, are suitable for use.

Step 1420 is followed by step 1430.

In step 1430, the paper is charged so that a charge pattern of charged and discharged areas is formed on the paper, wherein the discharged areas correspond to the selected fluid pattern or the image area defined thereby. In various embodiments, the paper is positioned between a biasable backing member and a charging member. The biasable backing member can be a plate and is preferably electrically grounded. The back side of the paper is preferably in contact with the backing member. In various embodiments, the recording medium is transported on an electrically-conductive belt and the belt is the backing member.

In various embodiments, the paper is electrically charged to a potential between 100V and 500V with a charge of a first polarity. The fluid pattern, the area that received the hydrophilic liquid on the front side, is more electrically conductive than the non jetted area. As a result, charge deposited on the area of the paper in the fluid pattern can dissipate to the grounded backing electrode or another charge-sink electrode. In contrast, the charge is held in the dry area of the paper outside the fluid pattern. As a result, a charge pattern of charged and discharged areas is formed on the paper and the charged areas have a potential of, e.g., at least 100 V.

In various embodiments, the hydrophilic liquid jetted onto the dry paper penetrates the paper sufficiently to decrease the resistivity of the wetted regions of the paper to no more than 5% of the resistivity of the dry portion of the paper, or to no greater than $5\times10^{11}$ Ω-cm.

Step 1430 is followed by step 1440.

In step 1440, charged dry ink having charge of the same sign as the charge in the charged areas on the paper is deposited onto the paper in a dry ink pattern corresponding to, although not necessarily identical to, the selected fluid pattern in the selected region. The dry ink pattern can deviate from the fluid pattern because of the stochastic nature of the dry-dry ink deposition process.

To deposit the dry ink, the paper is brought into operational proximity to a biased development station containing dry ink. The thy ink has a charge of the first polarity, as does the charge in the dry areas of the paper. The bias on the development station has the same first polarity. This is a discharged-area development (DAD) process. After deposition, the dry ink is held to the surface of the paper by forces including van der Waal's forces.

In various embodiments, the magnitude of the bias on the development station is less than that on the dry areas of the paper, so that dry ink in proximity with the paper is driven into the discharged areas corresponding to the fluid pattern. In various embodiments, the bias applied to the development station is less than the bias applied to the dry portions of the paper but greater than the bias on the wet portions of the paper. In various embodiments, the development station is a magnetic development station, as described above, or an aerosol or powder-cloud development station.

Step 1440 is followed by step 1450, or optionally by step 1445.

In optional step 1445, the selected region of the paper is dried after depositing the dry ink (step 1440) and before fixing the dry ink (step 1450). Step 1445 is followed by step 1450.

This optional drying step can reduce the formation of blisters in the semiporous recording medium. During fixing step 1450, the hydrophilic liquid that has soaked into the surface of the recording medium can be brought to a boil. If this happens too quickly for the resulting gas to escape the paper gradually, the resulting internal pressure in the paper can puncture part of the paper's thickness to permit the gas to leave the paper. This leaves a blister in the paper where the pressure built up and then was catastrophically released. These blisters can reduce image quality. Drying the paper before fixing, and doing so at a lower thermal flux than used for fixing, permits the gas to escape the paper gradually rather than by mechanical explosion. This reduces the formation of blisters.

In step 1450, the dry ink is permanently fixed (e.g., fused) to the paper. This can be accomplished by subjecting the image-bearing recording medium to heat and pressure to raise the temperature of the dry ink above its glass transition temperature $T_g$ so the dry ink is viscous rather than glassy. The viscous dry ink particles adhere to the recording medium and cohere to other dry ink particles to form a coherent dry ink mass. The pressure forces the dry ink particles to flow together and encourages adhesion to the paper. In various embodiments, prints with a high gloss are produced by casting the printed paper against a smooth surface, such as a nickel or polyimide belt, under heat and pressure. This can be done after fixing or instead of fixing. The dry ink on the print is permitted to cool below $T_g$ before it is separated from the belt.

In various embodiments, tactile prints are produced. Tactile prints are prints having raised features than can be perceived by the sense of touch. Examples include Braille prints, raised-letter prints, and raised-texture prints. In some of these embodiments, the dry ink deposited on the paper has a median volume-weighted diameter of at least 20 μm. In some of these embodiments, the dry ink is clear, or uncolored, or does not contain a colorant. The dry ink therefore provides texture without significantly affecting the appearance of any content present underneath the dry ink. In some of these embodiments, clear dry ink is used together with a hydrophilic liquid containing colorants, e.g., dyes or pigments. This provides prints having color images or other patterns printed with the hydrophilic liquid, and tactile features formed from the clear dry ink over those patterns.

In various embodiments, the dry ink deposited on the paper includes thermoplastic polymer binders. Some of these binders will cross-link when activated (e.g., by heat or UV, as discussed above), and some of these binders will not. The latter will soften when exposed to heat during fixing or glossing then return to a glassy state when they cool. Dry inks containing binders of the former type are referred to herein as "thermosettable dry inks." Dry inks containing binders of the latter type are referred to herein as "fusible dry inks." The binders of both thermosettable dry inks and fusible dry inks are in the thermoplastic state when the dry ink is deposited on the recording medium. After thermosettable dry inks are fixed, their binders are in the thermoset state.

In fixing step 1450, heat or pressure is applied to fusible dry inks. In fixing step 1450, thermosettable dry inks are activated so that their binders cross-link instead of softening. Thermosettable dry inks can also be heated either as part of or in addition to activating their binders, and either before or after activation.

In various embodiments, thermosettable dry inks are used. The hydrophilic liquid has no significant chemical interactions with the binders, and the binders cross-link when activated in fixing step 1450.

In various embodiments, thermosettable dry inks are used. The hydrophilic liquid reacts chemically with the thermosettable dry inks to cause the dry inks to cross-link. This reaction can take place on contact, during deposition step 1440, or take place upon activation in fixing step 1450.

In various embodiments, "thermoset dry inks" (as opposed to thermosettable dry inks) are deposited in step 1440. Thermoset dry inks are dry inks whose binders are already in the thermoset state (i.e., already cross-linked) when they are deposited on the paper. In these embodiments, fixing step 1450 is followed by overcoating step 1455. In overcoating step 1455, an overcoating material such as a varnish is applied to the paper bearing the thermoset dry ink. The overcoating material adheres the thermoset dry ink to the recording medium. In various embodiments, the hydrophilic liquid is an adhesive. The thermoset dry inks are adhered to the paper by the hydrophilic liquid.

In various embodiments, dry ink is removed from the recording medium after deposition. In these embodiments, step 1450 is followed by step 1460. The dry ink is at least in part hydrophilic (e.g., includes open- or closed-cell porous dry ink particles, or includes dry ink particles having hydrophilic addenda). As a result, when the dry ink is deposited, at least some of the deposited dry ink adheres to the hydrophilic liquid (deposited in step 1420), and at least some of the hydrophilic liquid is drawn into or around the deposited dry ink particles. The hydrophilic liquid includes suspended colorant (e.g., pigment particles). FIGS. 10D-10F, discussed above, show an example of this interaction between hydrophilic colorant-containing liquid and hydrophilic dry ink deposited on top of the liquid. After the deposited dry ink has absorbed at least some of the hydrophilic liquid (i.e., after being deposited on the wetted areas of the recording medium), at least some of the dry ink is removed from the recording medium. As a result, at least some of the suspended colorant remains on the recording medium after the dry ink, and at least some of the liquid in or around it, is removed. FIG. 10G shows an example of hydrophilic liquid with some colorant remaining after dry ink has been removed. In various embodiments, the dry ink does not include a colorant. In these embodiments, dry ink is used solely to remove water from the recording medium to permit inkjet printing on semi-porous recording media.

Figure 15:
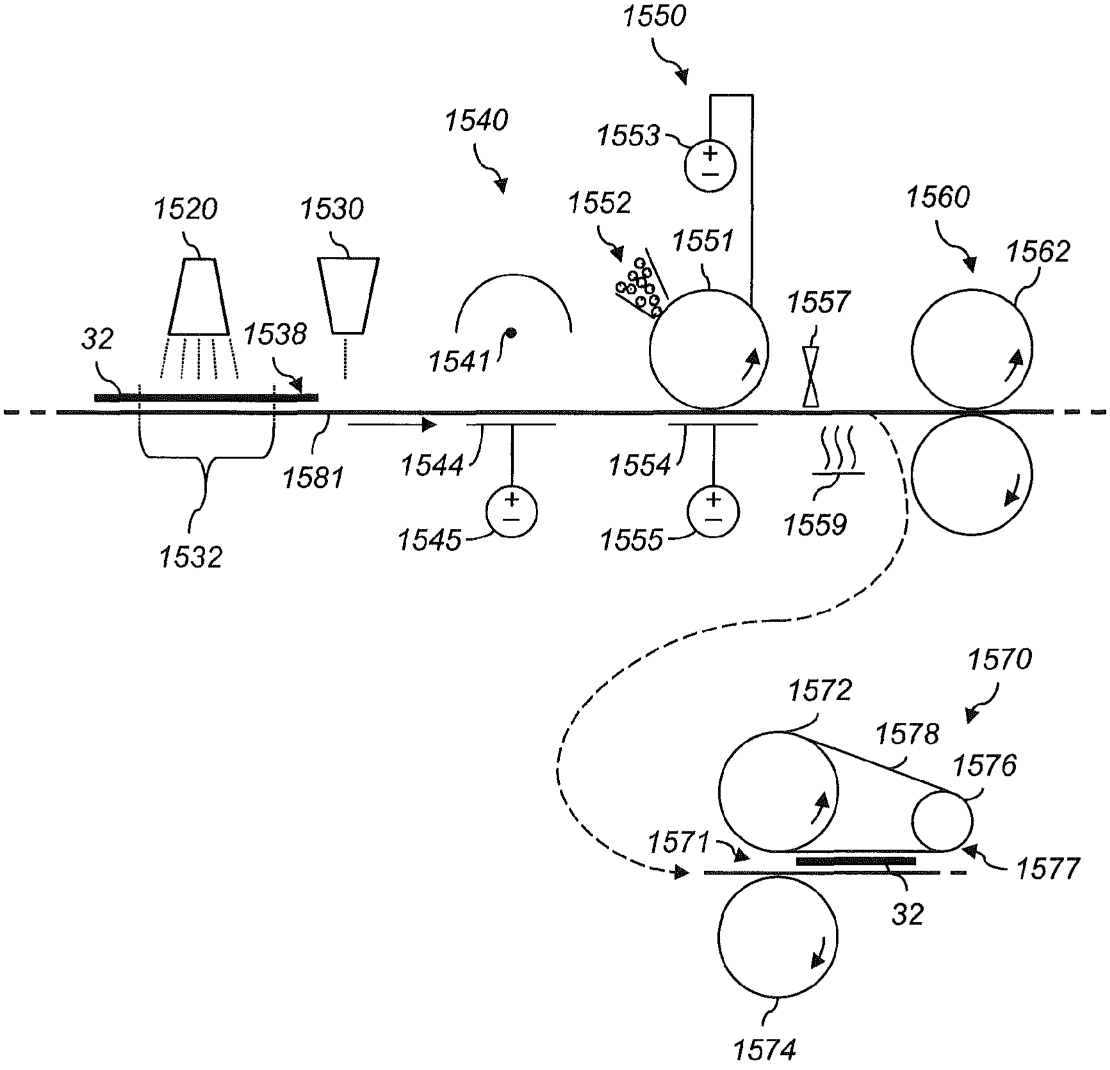
FIG. 15 is a schematic of apparatus for producing a print on paper.

FIG. 15 is a schematic of apparatus for producing a print on paper recording medium 32. Unlike the electrophotographic printer shown in FIG. 6, this apparatus does not use photoreceptor 625 (FIG. 6) or other photosensitive imaging member to control where dry ink is deposited on recording medium 32. The data path shown in FIG. 7 can be used with this printer.

A transport (not shown) moves the paper (recording medium 32) along a paper path (not shown), also called a "transport path." In the embodiment shown, the transport includes transport belt 1581. The transport can also include a drum, stage, or other device for moving the paper (recording medium 32). Recording medium 32 can be a sheet or web. Throughout the discussion of FIG. 15 and related material, recording medium 32 is paper, and the paper path is the path along which recording medium 32 is moved through the printer.

Dryer 1520, liquid-deposition unit 1530, charging member 1540, development station 1550, optional dry ink-removal device 1557, and fixer 1560 (or 1570, as discussed below) are arranged in that order along the paper path.

Dryer 1520 dries a selected region 1532 of recording medium 32 (i.e., the paper) on the transport to a moisture content not to exceed that of the paper equilibrated to 20% RH. This is as described above with reference to FIGS. 12-13. Dryer 1520 can include a source of infrared or ultraviolet radiation (shown), a hot-air source, or a dehumidifier. Dryer 1520 can include a heated roller (not shown). Dryer 1520 can dry the paper by irradiation, heating, desiccation, or other ways. Dryer 1520 can include a paper-conditioning unit.

Liquid-deposition unit 1530 deposits hydrophilic liquid in a selected fluid pattern on all or part of region 1532 of recording medium 32 within 15 seconds of the completion of drying. This produces a wetted area of the recording medium in which the hydrophilic liquid has wet the recording medium. In the embodiments shown, the speed of transport of recording medium 32 along transport belt 1581 is at least fast enough to carry the leading edge of recording medium 32 from dryer 1520 to liquid-deposition unit 1530 in at most ten seconds. In various embodiments, the hydrophilic liquid is hydrophilic ink. In various embodiments, the image-wise depositing device is an inkjet. Inkjet deposition as described herein can be performed by drop-on-demand or continuous printheads.

Charging member 1540 including two electrodes 1541, 1544 of any shape, each connected to a power supply or a fixed potential (e.g., ground), are arranged on opposite sides of the paper path. In the embodiments shown, electrode 1541 is a corona wire partially surrounded by a shield, and electrode 1544 is a flat plate. The electrodes selectively charge recording medium 32 in region 1532 while region 1532 is between them. A charge pattern of charged and discharged areas is thus formed on the paper and the charged areas have a potential of at least 100 V. That is, the charger charges the dry areas, but the liquid in the wet areas discharges any local accumulations of charge, inhibiting charging. As a result, the charge pattern corresponds to the fluid pattern; the discharged areas are approximately the areas where liquid was deposited by liquid-deposition unit 1530. Source 1545 can provide voltage or current to electrode 1544; a corresponding source (not shown) can provide voltage or current to electrode 1541.

In various embodiments, electrode 1544 is a grounded (or fixed-biased) backing plate behind recording medium 32 at charging member 1540. In various embodiments, recording medium 32 is in physical contact at one or more point(s) with electrode 1544 so charge can be conducted from recording medium 32 to ground (or source 1545) through electrode 1544. This provides more rapid and controlled charging than if the charge has to arc across an air gap between recording medium 32 and electrode 1544. Charge transport without arcing also reduces the maximum voltages experienced during charging and reduces arc-induced damage to recording medium 32. However, air-gap charging can also be used.

Development station 1550 applies dry ink to recording medium 32. Biasable toning member 1551 and separately-biasable area electrode 1554 are arranged on opposite sides of region 1532 of recording medium 32 when region 1532 is in operational position with respect to development station 1550. The biases of toning member 1551 and area electrode 1554 are chosen so that the electric field between toning member 1551 and area electrode 1554 is strong enough to deposit dry ink onto any point of the selected region. In various embodiments, recording medium 32 is in contact with area electrode 1554.

Voltage source 1553 applies a bias to toning member 1551. The bias is less than the potential of the charged areas of recording medium 32 and greater than the potential of the uncharged areas of recording medium 32. Biases and potentials can be measured with respect to the area electrode. The area electrode can be driven to a specific potential by voltage source 1555, or can be grounded.

Supply 1552 includes charged dry ink particles. Supply 1552 includes various components adapted to provide dry ink to the printer and charge the dry ink. In various embodiments, supply 1552 includes a dry ink bottle (not shown), a gate for selectively dispensing metered amounts of dry ink from the bottle into a reservoir, and an auger in the reservoir for mixing the dry ink to tribocharge it. The charge of the dry ink has the same sign as the charge in the charged areas on recording medium 32.

As a result, when selected region 1532 of recording medium 32 is brought into operative arrangement with development station 1550, charged dry ink is deposited on recording medium 32 in a dry ink pattern corresponding to, although not necessarily identical to, the selected fluid pattern in selected region 1532. The dry ink deposition is effected by electrical forces arising from the charge on the dry ink particles and the electric field between toning member 1551, area electrode 1554, and the charge pattern on recording medium 32. For example, with positively charged dry ink, the electric field can be oriented from toning member 1551 to area electrode 1554 to cause dry ink particles on toning member 1551 to fall down the electric field towards recording medium 32.

In various embodiments, dry ink-removal device 1557 is downstream of development station 1550. Dry ink-removal device 1557 removes at least some of the deposited dry ink from recording medium 32. At least some of the suspended colorant remains on the recording medium after the dry ink, and any ink or hydrophilic liquid absorbed in or around it, is removed. Dry ink-removal device 1557 can include one or more electrodes that produce a field that attracts any residual charge on the dry ink away from recording medium 32. Dry ink-removal device 1557 can also include a vacuum, air knife, or skive to dislodge dry ink particles mechanically. Dry ink removal can also be performed using a rotating cleaning brush such as a vacuum fur brush.

In various embodiments, second dryer 1559 is arranged along the paper path between development station 1550 and fixer 1560. Dryer 1559 is adapted to dry the selected region of the paper. This is discussed above with respect to step 1445 shown in FIG. 14. In embodiments using dry-ink removal device 1557 and second dryer 1559, the two can be arranged along the paper path in either order. Dryer 1559 can apply heat, infrared or other electromagnetic radiation, or vacuum to recording medium 32, either with or without direct mechanical contact with recording medium 32.

In various printers such as that shown in FIG. 6, silica surface treatments are added to the toner to assist transfer by transfer subsystem 650. These treatments are submicrometer particulate addenda on the surface of the toner particles. In embodiments shown in FIGS. 14 and 15, no transfer step is performed, since the toner is developed directly onto recording medium 32. Therefore, in various embodiments, dry inks not containing silica surface treatments are used. Silica can make dry ink less cohesive and lead to increased satellite formation. In embodiments not using silica, smaller dry ink particles (e.g., 4-12 μm) can be used, thereby providing improved resolution; the lack of a transfer step provides this advantage without increasing satellite formation.

Fixer 1560 is adapted to permanently fix the deposited dry ink to recording medium 32. In an example, fuser 660 (FIG. 6) is used as fixer 1560. In various embodiments, fixer 1560 includes heated fixing member 1562.

In various embodiments, fixer 1560 includes a microwave source followed by a heat source. Recording medium 32 is first irradiated with microwaves to evaporate at least some of the hydrophilic liquid deposited by liquid-deposition unit 1530. Some of the resulting heat in the hydrophilic liquid can be transferred conductively or radiatively to the dry ink on recording medium 32 to tack the dry ink to recording medium 32. The dry ink on recording medium 32 is then heated by the heat source (e.g., heated fixing member 1562) to fix the dry ink to recording medium 32. In various embodiments, the transport includes transport belt 1581 onto which recording medium 32 is held (e.g., electrostatically). The dry ink is deposited on a dry ink side 1538 of recording medium 32 away from transport belt 1581. In these embodiments, fixer 1570 is used instead of fixer 1560 to provide a desired surface finish, e.g., a glossy finish. Fixers 1560 and 1570 can also be used together in either order.

First and second rotatable members 1572, 1574, respectively, are arranged to form nip 1571 through which transport belt 1581 and recording medium 32 pass. First rotatable member 1572 is disposed on dry ink side 1538 of recording medium 32. At least one of the rotatable members 1572, 1574 is heated, e.g., rotatable member 1572.

Tensioning member 1576 is positioned downstream of first and second rotatable members 1572, 1574 in the direction of travel of recording medium 32. Rotatable finishing belt 1578 is entrained around first rotatable member 1572 and tensioning member 1576. As a result, separation point 1577 is defined at which recording medium 32 separates from finishing belt 1578. For example, it is often desirable to separate the receiver from the finishing belt after the toner has cooled to a temperature less than its $T_g$. The distance required between heating and separation depends on the process speed, whether or not the receiver or finishing belt are actively cooled, and the temperature to which the toner was heated. Finishing belt 1578 has a desired surface finish or texture, e.g., a smooth surface for a glossy print, or a textured surface for a ferrotyped print. The length and the speed of rotation of finishing belt 1578 are selected so that dry ink on recording medium 32 is heated above its glass transition temperature (Tg) by the heated one of the rotatable members 1572, 1574 and the dry ink on recording medium 32 cools to below Tg before reaching separation point 1577.

The methods shown in FIG. 14 and the apparatus shown in FIG. 15 can be used with paper or with a porous or semiporous recording medium, as described above. FIGS. 10A-10G show an example of semiporous recording medium 32 receiving inkjet drop 910, which is representative of hydrophilic liquid deposited using any device appropriate for image-wise deposition of the hydrophilic liquid. FIG. 10C shows wetting of the surface of recording medium 32. FIG. 10D shows dry ink particles 920 being deposited onto the ink. This is in contrast to FIGS. 9A-9F, which show an example of the same sequence of events as FIGS. 10A-10F, but on a porous receiver.

The recording medium can be charged (step 1430, FIG. 14) using either a corona or roller charger. The recording medium is inserted into a charging unit and charge is deposited onto the inked surface of the paper. The back surface of the recording medium is maintained adjacent to an electrode, e.g., a grounded electrode. Examples of electrodes include metal plates and rollers.

When the hydrophilic dry ink is deposited onto the ink, at least some of the deposited dry ink adheres to the hydrophilic ink, and ink is drawn into or around the dry ink particles. Dry ink is hydrophilic if it contains components that are wettable. A wettable component is a material, such as a solid, that has a surface energy greater than 45 ergs/cm$^2$, as determined by, e.g., determining the contact angle of a compaction or fused solid of that material using diiodomethane and water, adding the polar and dispersive contributions to the surface energy, and using the Good-Girifalco approximation to estimate the interfacial energy.

In various embodiments, the dry ink is hydrophilic or contains hydrophilic addenda such a hydrophilic silica, calcium oxide, calcium carbonate, magnesium oxide, or other hydrophilic ceramics and salts. The addenda can have diameters less than approximately 100 nm to avoid interfering with the visual characteristics of the printed image.

In various embodiments, the dry ink has an open cell porous structure and contains hydrophilic addenda. This permits the dry ink to absorb more ink solvent.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST

20 continuous printing system
22 image source

24 image processing unit
26 mechanism control circuits
28 drop forming device
30 printhead
32 recording medium
34 recording medium transport system
36 recording medium transport control system
38 micro-controller
40 reservoir
42 catcher
44 recycling unit
46 pressure regulator
47 ink manifold
48 jetting module
49 nozzle plate
50 plurality of nozzles
51 heater
52 filament
54 small drops
56 large drops
57 trajectory
58 drop stream
60 gas flow deflection mechanism
61 positive pressure gas flow structure
62 gas flow
63 negative pressure gas flow structure
64 deflection zone
66 small drop trajectory
68 large drop trajectory
72 first gas flow duct
74 lower wall
76 upper wall
78 second gas flow duct
82 upper wall
84 seal
86 liquid return duct
88 plate
90 front face
92 positive pressure source
94 negative pressure source
96 wall
400 inkjet printhead
401 inkjet printer system
402 image data source
404 controller
405 image processing unit
406 electrical pulse source
408 first fluid source
409 second fluid source
410 inkjet printhead die
411 substrate
420 first nozzle array
421 nozzle(s)
422 ink delivery pathway (for first nozzle array)
430 second nozzle array
431 nozzle(s)
432 ink delivery pathway (for second nozzle array)
481 droplet(s) (ejected from first nozzle array)
482 droplet(s) (ejected from second nozzle array)
500 printer chassis
502 paper load entry direction
503 print region
504 media advance direction
505 carriage scan direction
506 right side of printer chassis
507 left side of printer chassis
508 front of printer chassis
509 rear of printer chassis
510 hole (for paper advance motor drive gear)
511 feed roller gear
512 feed roller
513 forward rotation direction (of feed roller)
530 maintenance station
540 carriage
550 printhead assembly
562 multi-chamber ink tank
564 single-chamber ink tank
580 carriage motor
582 carriage guide rail
583 encoder fence
584 belt
590 printer electronics board
592 cable connectors
600 printer
621 charger
621*a* voltage source
622 exposure subsystem
623 toning station
623*a* voltage source
625 photoreceptor
625*a* voltage source
632A, 6328 recording medium
638 print image
639 fused image
640 supply unit
650 transfer subsystem
660 fuser
662 fusing roller
664 pressure roller
665 fusing nip
668 release fluid application substation
669 output tray
670 finisher
681 transport web
686 cleaning station
691, 692, 693, 694, 695, 696 printing module
699 logic and control unit (LCU)
700 input pixel levels
705 workflow inputs
710 image-processing path
720 output pixel levels
750 screening unit
760 screened pixel levels
770 print engine
810 data processing system
820 peripheral system
830 user interface system
840 data storage system
910 inkjet drop
920 dry ink particle
1105 print image
1110 non-contact fusing step
1115 tacked image
1120 fusing step
1125 fused image
1130 glossing step
1135 glossed image
1410 dry paper step
1420 deposit liquid in fluid pattern step
1430 charge paper step
1440 deposit dry ink step
1445 dry paper step
1450 fix dry ink step
1455 overcoat paper step

1460 remove dry ink step
1520 dryer
1530 liquid-deposition unit
1532 region
1538 dry ink side
1540 charging member
1541, 1544 electrode
1545 source
1550 development station
1551 toning member
1552 supply
1553 voltage source
1554 area electrode
1555 voltage source
1557 dry ink-removal device
1559 dryer
1560 fixer
1562 fixing member
1570 fixer
1571 nip
1572, 1574 rotatable member
1576 tensioning member
1577 separation point
1578 finishing belt
1581 transport belt
d spacing
X axis
Y axis

The invention claimed is:

1. Apparatus for producing a print on a semiporous recording medium, comprising:

a transport that moves the semiporous recording medium along a transport path;

a dryer, a liquid-deposition unit, a charging member, a development station, and a fixer arranged in that order along the transport path;

the dryer dries a selected region of the semiporous recording medium to a moisture content not to exceed that of the recording medium equilibrated to 20% RH;

the liquid-deposition unit deposits hydrophilic liquid in an image-wise selected fluid pattern on the selected region of the recording medium within 15 seconds after the completion of drying, whereby a wetted area of the recording medium is produced so that the resistivity of the wetted area of the semiporous recording medium becomes no greater than $5\times10^{11}$ Ω-cm;

the charging member charges the selected region of the recording medium so that a charge pattern of charged and discharged areas is formed on the recording medium and the charged areas have a potential of at least 100 V; and the development station deposits charged dry ink in a dry ink pattern corresponding to the image-wise selected fluid pattern, the dry ink having charge of the same sign as the charged areas, wherein the charged dry ink is deposited on the paper in the dry ink pattern corresponding to the image-wise selected fluid pattern in the selected region by electrical forces arising from the charge on the dry ink and the electric field between the development station and the charge pattern on the paper.

2. The apparatus according to claim 1, further including a fixer permanently fixes the dry ink to the paper.

3. The apparatus according to claim 1, wherein the hydrophilic liquid includes suspended colorant, the apparatus further including a device for removing at least some of the deposited dry ink from the recording medium, whereby some of the suspended colorant remains on the recording medium after the dry ink is removed.

4. The apparatus according to claim 1, wherein the bias of the development station is less than the bias applied to the non-wetted area of the paper but greater than the bias on the wetted area of the paper.

5. The apparatus according to claim 1, wherein the dry ink includes open-cell, porous dry ink particles.

6. The apparatus according to claim 5, wherein the open cells contain hydrophilic addenda.

7. The apparatus according to claim 1, wherein the dry ink does not include a colorant.

8. The apparatus according to claim 1, wherein the charging member includes two electrodes arranged on opposite sides of the transport path and selectively charges the selected region of the paper between them.

9. The apparatus according to claim 1, wherein the development station includes a biasable toning member and a biasable area electrode arranged on opposite sides of the selected region of the paper.

10. The apparatus according to claim 1, wherein the dry ink includes dry ink particles and does not include particulate addenda having diameters $<1$ μm on the surface of the dry ink particles.

11. The apparatus according to claim 1, further including a second dryer arranged along the transport path between the development station and the fixer, the second dryer dries the selected region of the semiporous recording medium.

* * * * *